United States Patent
Hori et al.

(10) Patent No.: US 10,911,988 B2
(45) Date of Patent: Feb. 2, 2021

(54) COMMUNICATION NODE, TERMINAL, AND COMMUNICATION CONTROL METHOD

(71) Applicant: Panasonic Intellectual Property Corporation of America, Torrance, CA (US)

(72) Inventors: Takako Hori, Kanagawa (JP); Hiroyuki Ehara, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 205 days.

(21) Appl. No.: 15/788,722

(22) Filed: Oct. 19, 2017

(65) Prior Publication Data

US 2018/0041924 A1 Feb. 8, 2018

Related U.S. Application Data

(63) Continuation of application No. PCT/JP2016/001495, filed on Mar. 16, 2016.

(30) Foreign Application Priority Data

May 20, 2015 (JP) ................. 2015-102810

(51) Int. Cl.
*H04W 36/00* (2009.01)
*H04W 36/14* (2009.01)
(Continued)

(52) U.S. Cl.
CPC ......... *H04W 36/0022* (2013.01); *G10L 19/22* (2013.01); *H04W 36/14* (2013.01);
(Continued)

(58) Field of Classification Search
CPC ................................. H04W 36/0022
See application file for complete search history.

(56) References Cited

U.S. PATENT DOCUMENTS 6,856,612 B1 * 2/2005 Bjelland ............... H04M 7/128
370/338
6,879,600 B1 * 4/2005 Jones .................... H04L 63/104
370/332

(Continued)

FOREIGN PATENT DOCUMENTS

| WO | 2012/169134 A1 | 12/2012 |
| WO | 2013/080471 A1 | 6/2013 |
| WO | 2013/156063 A1 | 10/2013 |

OTHER PUBLICATIONS

International Search Report of PCT application No. PCT/JP2016/001495 dated Jun. 7, 2016.

(Continued)

*Primary Examiner* — Andrew Lai
*Assistant Examiner* — Andrew C Lee
(74) *Attorney, Agent, or Firm* — Seed IP Law Group LLP

(57) ABSTRACT

A communication node determines a codec and a codec mode to be used by two terminals that perform communication in a first network, when one of the two terminals performs handover to a second network that is different from the first network. The communication node includes: a determiner that sets common part for a codec and a codec mode to be used by the two terminals, the common part being common among information indicating codecs and codec modes used for communication in the first network, information indicating codecs and codec modes supported by the one terminal, and information indicating codecs and codec modes supported by the second network; and a generator that generates signaling for requesting the two terminals to perform changing to the set codec and codec mode to be used by the two terminals.

16 Claims, 12 Drawing Sheets

(51) Int. Cl.
*H04W 36/24* (2009.01)
*G10L 19/22* (2013.01)
H04W 28/18 (2009.01)
G10L 19/24 (2013.01)
H04W 88/18 (2009.01)
G10L 19/16 (2013.01)

(52) U.S. Cl.
CPC ............ *H04W 36/24* (2013.01); *G10L 19/173* (2013.01); *G10L 19/24* (2013.01); *H04W 28/18* (2013.01); *H04W 36/0066* (2013.01); *H04W 88/181* (2013.01)

(56) References Cited

U.S. PATENT DOCUMENTS

| | | | | |
|---|---|---|---|---|
| 7,305,230 B2* | 12/2007 | Zhigang | H04M 3/4938 | 455/412.1 |
| 7,443,879 B2* | 10/2008 | Ejzak | H04W 88/181 | 370/260 |
| 7,602,901 B1* | 10/2009 | Kates | H04M 3/02 | 379/373.01 |
| 7,688,745 B1* | 3/2010 | Hurtta | H04L 69/24 | 370/252 |
| 8,254,372 B2* | 8/2012 | Rabipour | H04L 65/1069 | 370/352 |
| 8,383,699 B2* | 2/2013 | Williams, Jr. | C09D 11/033 | 523/160 |
| 8,483,699 B1* | 7/2013 | Oroskar | H04W 76/12 | 455/450 |
| 8,908,605 B1* | 12/2014 | Oroskar | H04W 28/0231 | 370/328 |
| 9,071,669 B2* | 6/2015 | Noldus | H04L 65/80 | |
| 9,386,563 B1* | 7/2016 | Oroskar | H04W 72/0406 | |
| 9,401,975 B2* | 7/2016 | Hori | H04W 76/10 | |
| 9,456,388 B2* | 9/2016 | Hori | H04W 36/14 | |
| 9,614,714 B2* | 4/2017 | Belling | H04L 65/1046 | |
| 9,848,339 B2* | 12/2017 | Huang | H04W 24/02 | |
| 2002/0029142 A1* | 3/2002 | Koo | H04L 29/06 | 704/221 |
| 2004/0131051 A1* | 7/2004 | Rabipour | H04W 76/12 | 370/352 |
| 2006/0165060 A1* | 7/2006 | Dua | G06Q 20/42 | 370/352 |
| 2006/0174015 A1* | 8/2006 | Arauz-Rosado | H04L 65/80 | 709/228 |
| 2007/0011277 A1* | 1/2007 | Neff | H04N 19/85 | 709/218 |
| 2007/0058609 A1* | 3/2007 | Goel | H04L 65/1043 | 370/352 |
| 2007/0165636 A1* | 7/2007 | He | H04W 88/181 | 370/391 |
| 2007/0171841 A1* | 7/2007 | Witzel | H04L 65/103 | 370/254 |
| 2007/0183323 A1* | 8/2007 | Hannu | H04L 1/0014 | 370/230 |
| 2007/0189275 A1* | 8/2007 | Neff | H04N 7/148 | 370/352 |
| 2007/0297352 A1* | 12/2007 | Jabri | H04L 65/104 | 370/261 |
| 2008/0212575 A1* | 9/2008 | Westberg | H04L 1/0014 | 370/356 |
| 2009/0270099 A1* | 10/2009 | Gallagher | H04W 8/08 | 455/435.1 |
| 2010/0172332 A1* | 7/2010 | Rao | H04L 1/0014 | 370/338 |
| 2010/0232297 A1* | 9/2010 | Johansson | H04L 1/0009 | 370/241 |
| 2010/0284278 A1* | 11/2010 | Alanara | H04L 47/2416 | 370/235 |
| 2011/0075563 A1* | 3/2011 | Leung | H04L 47/263 | 370/236 |
| 2011/0294501 A1* | 12/2011 | Wang | H04L 69/24 | 455/426.1 |
| 2012/0014275 A1* | 1/2012 | Koo | H04W 24/10 | 370/252 |
| 2012/0028642 A1* | 2/2012 | Schliwa-Bertling | C12N 5/0686 | 455/436 |
| 2013/0100887 A1* | 4/2013 | Kim | H04L 65/1046 | 370/328 |
| 2013/0176944 A1* | 7/2013 | Luo | H04W 8/26 | 370/328 |
| 2013/0230057 A1* | 9/2013 | Hori | H04W 76/10 | 370/466 |
| 2013/0272194 A1* | 10/2013 | Keller | H04W 36/0022 | 370/328 |
| 2014/0099966 A1* | 4/2014 | Hori | H04W 76/22 | 455/450 |
| 2014/0219246 A1* | 8/2014 | Khay-Ibbat | H04W 36/0022 | 370/331 |
| 2014/0269624 A1* | 9/2014 | Khay-Ibbat | H04W 36/30 | 370/332 |
| 2014/0328323 A1* | 11/2014 | Zhang | H04L 69/24 | 370/331 |
| 2014/0342739 A1* | 11/2014 | Hori | H04W 36/0005 | 455/436 |
| 2015/0078295 A1* | 3/2015 | Mandyam | H04L 65/403 | 370/329 |
| 2015/0195208 A1* | 7/2015 | Ozawa | H04L 47/25 | 370/230 |
| 2016/0156544 A1* | 6/2016 | Holm | H04L 65/103 | 370/389 |
| 2016/0204908 A1* | 7/2016 | Rafique | H04L 1/0014 | 370/252 |

OTHER PUBLICATIONS

3GPP TS 23.216 V12.2.0, "3rd Generation Partnership Project; Technical Specification Group Services and System Aspects; Single Radio Voice Call Continuity (SRVCC)", Dec. 2014.
3GPP TS 23.237 V12.8.0, "3rd Generation Partnership Project; Technical Specification Group Services and System Aspects; IP Multimedia Subsystem (IMS) Service Continuity", Dec. 2014.
3GPP TS 26.071 V12.0.0, "3rd Generation Partnership Project; Technical Specification Group Services and System Aspects; Mandatory speech Codec speech processing functions; AMR speech Codec; General description", Sep. 2014.
3GPP TS 26.171 V12.0.0, "3rd Generation Partnership Project; Technical Specification Group Services and System Aspects; Speech codec speech processing functions; Adaptive Multi-Rate-Wideband (AMR-WB) speech codec; General description", Sep. 2014.
3GPP TS 26.441 V12.1.0, "3rd Generation Partnership Project; Technical Specification Group Services and System Aspects; Codec for Enhanced Voice Services (EVS); General overview", Dec. 2014.
SP-140485, 3GPP (TM) Work Item Description, "Support of EVS in 3G Circuit-Switched Networks", Sep. 2014.
3GPP TS 26.201 V12.0.0, "3rd Generation Partnership Project; Technical Specification Group Services and System Aspects; Speech codec speech processing functions; Adaptive Multi-Rate-Wideband (AMR-WB) speech codec; Frame structure", Sep. 2014.
IETF RFC 4867, "RTP Payload Format and File Storage Format for the Adaptive Multi-Rate (AMR) and Adaptive Multi-Rate Wideband (AMR-WB) Audio Codecs", Apr. 2007.
3GPP TS 26.445 V12.2.0, "3rd Generation Partnership Project; Technical Specification Group Services and System Aspects; Codec for Enhanced Voice Services (EVS); Detailed Algorithmic Description", Mar. 2015.
3GPP TS 26.114 V12.9.0, "3rd Generation Partnership Project; Technical Specification Group Services and System Aspects; IP Multimedia Subsystem (IMS); Multimedia Telephony; Media handling and interaction", Mar. 2015.
3GPP TS 26.103 V12.0.0, "Digital cellular telecommunications system (Phase 2+); Universal Mobile Telecommunications System (UMTS); Speech codec list for GSM and UMTS", Sep. 2014.

* cited by examiner

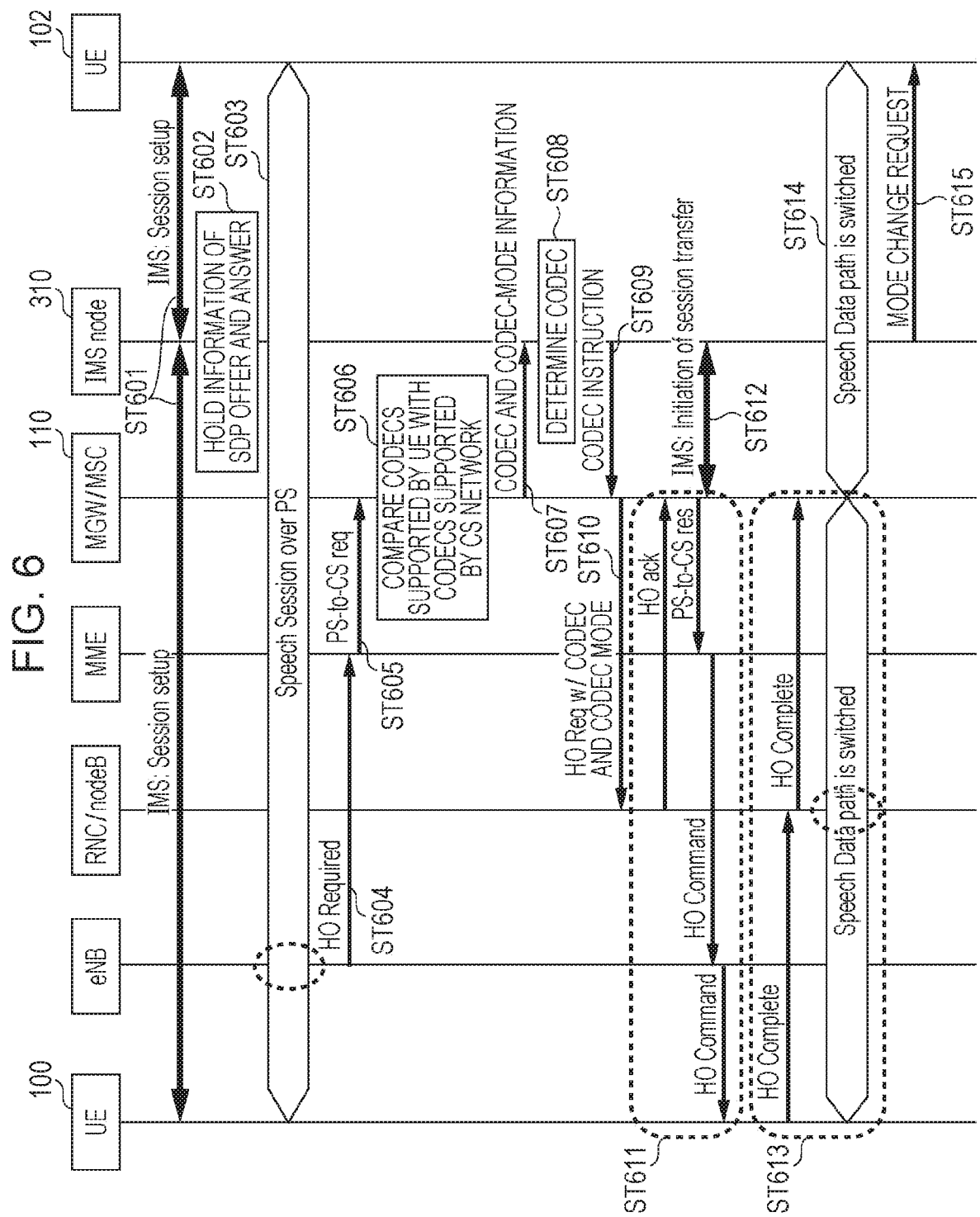

FIG. 7

| SDP offer |
|---|
| m=audio 49152 RTP/AVP 97 98 99 100 101<br>a=tcap:1 RTP/AVPF<br>a=pcfg:1 t=1<br>b=AS:42<br>b=RS:0<br>b=RR:2000<br>a=rtpmap:97 EVS/16000/1<br>a=fmtp:97 br=7.2-24.4; bw=nb-swb; max-red=220<br>a=rtpmap:98 AMR-WB/16000/1<br>a=fmtp:98 mode-change-capability=2; max-red=220<br>a=rtpmap:99 AMR-WB/16000/1<br>a=fmtp:99 mode-change-capability=2; max-red=220; octet-align=1<br>a=rtpmap:100 AMR/8000/1<br>a=fmtp:100 mode-change-capability=2; max-red=220<br>a=rtpmap:101 AMR/8000/1<br>a=fmtp:101 mode-change-capability=2; max-red=220; octet-align=1<br>a=ptime:20<br>a=maxptime:240 |
| SDP answer |
| m=audio 49152 RTP/AVPF 97<br>a=acfg:1 t=1<br>b=AS:65<br>b=RS:0<br>b=RR:2000<br>a=rtpmap:97 EVS/16000/1<br>a=fmtp:97 br=9.6-24.4; bw=swb; max-red=220<br>a=ptime:20<br>a=maxptime:240 |

FIG. 8

```
EVS:     13.2, 9.6, 8, 7.2, 5.9 kbps
AMR-WB: 12.65, 8.85, 6.6 kbps
AMR:    12.2, 7.4, 5.9, 4.75 kbps
```

COMMUNICATION NODE, TERMINAL, AND COMMUNICATION CONTROL METHOD

BACKGROUND

1. Technical Field

The present disclosure relates to a communication node, a terminal, and a communication control method that perform codec control used in a mobile communication system.

2. Description of the Related Art

Heretofore, voice calls in Third Generation Partnership Project (3GPP) mobile communication systems have been performed using 3GPP circuit switching (CS) networks. Recent years have seen an increase in Voice over Long-Term Evolution (VoLTE) services, which are voice calls using 3GPP packet switching (PS) networks.

However, areas in which the VoLTE services are available are limited for the time being. Thus, when a communication terminal moves out of a VoLTE service area during a VoLTE voice call (hereinafter referred to as a "VoLTE call"), it is necessary to switch the call to a call using a conventional circuit switching system. As a technology that enables the switching, Single Radio Voice Call Continuity (SRVCC) described in 3GPP TS23.216 v12.2.0 "Single Radio Voice Call Continuity (SRVCC)" (hereinafter may be referred to as "Non-Patent Document 1") has been available. An operation of handover based on SRVCC will be described below with reference to FIGS. 1 and 2.

FIG. 1 illustrates a portion of the configuration of a 3GPP mobile communications network. The mobile communications network illustrated in FIG. 1 includes an evolved Universal Terrestrial Radio Access Network (e-UTRAN), an e-UTRAN base station (e-nodeB), a PS network, a CS network, a base station subsystem for the CS network, and an IP Multimedia Subsystem (IMS).

Specifically, in FIG. 1, the e-UTRAN is a wireless access network that can provide VoLTE services. The PS network includes a Packet Data Network Gateway (P-GW), a Serving Gateway (S-GW), and a Mobility Management Entity (MME) and provides VoLTE services. The CS network includes a Mobile Switching Center (MSC) and a Media GateWay (MGW). The base station subsystem for the CS network includes a Radio Network Controller (RNC) and a nodeB. The IMS includes a Call Session Control Function (CSCF) and a Service Centralization and a Continuity Application Server (SCCAS) and performs call control and so on. Although the MSC and the MGW are illustrated as one node (an MSC/MGW 110) in FIGS. 1 and 2, they may be illustrated as independent nodes.

In FIG. 1, it is assumed that user equipment (UE) 100 and UE 102, which are mobile communication terminals, are initially connected to the PS network (however, a wireless access network, a base station, and a PS network at the UE 102 side are not illustrated). That is, it is assumed that the UEs 100 and 102 are performing a VoLTE call with each other. In this case, it is assumed that, in the middle of the call, the UE 100 performs handover (HO) to the CS network.

Paths A, B, and C denoted by solid lines in FIG. 1 represent paths through which call data passes, Reference numerals 200, 202, 204, and 206 denoted by dashed lines in FIG. 1 represent paths through which signaling in an SRVCC handover process passes.

FIG. 2 is a sequence chart illustrating an operation of the SRVCC handover process. The UEs 100 and 102 are initially connected to the PS network (e-UTRAN), and call data between the UE 100 and the UE 102 is transmitted/received through the path A. When the UE 100 attempts to move away from the coverage area of the e-UTRAN, the e-nodeB detects the movement and exchanges signaling (signaling 200 illustrated in FIG. 1) with the RNC/nodeB via the MME and the MSC/MGW 110 (step (hereinafter referred to as "ST") 200 illustrated in FIG. 2). In ST200, a data path in the CS network is prepared between the nodeB and the MSC/MGW 110, and when the preparation is finished, a command (HO Command) for handover to the UTRAN (CS network) is issued from the MME to the UE 100 via the e-nodeB.

Simultaneously with the process in ST200, the MSC/MGW 110 exchanges signaling (signaling 202 illustrated in FIG. 1) with the UE 102 via the CSCF/SCCAS (ST202 illustrated in FIG. 2). As a result, a command for switching the transmission/reception target of the call data of the UE 102 from the UE 100 to the MSC/MGW 110 is issued, so that the path B is established.

After the handover to the UTRAN, the UE 100 exchanges signaling (signaling 204 illustrated in FIG. 1) with the MSC/MGW 110 via the RNC/nodeB (ST204 illustrated in FIG. 2). As a result, the path C is established.

After the path C is established, the MSC/MGW 110 exchanges signaling (signaling 206 illustrated in FIG. 1) with the P-GW/S-GW via the MME (ST206 in FIG. 2). As a result, the path A is deleted.

The above description has been given of the operation of SRVCC handover.

Also, an SRVCC system (eSRVCC: enhanced-SRVCC) using Access Transfer Control Function (ATCF) enhancement, the system being described in 3GPP TS23.237 v12.8.0 "IP Multimedia Subsystem (IMS) Service Continuity" (hereinafter may be referred to as "Non-Patent Document 2"), is available as a modified SRVCC system for reducing the amount of time taken for data path switching. One example of the operation of eSRVCC will be described below with reference to FIGS. 3 and 4.

FIG. 3 illustrates a portion of the configuration of a 3GPP mobile communications network that enables eSRVCC. The mobile communications network illustrated in FIG. 3 includes an e-UTRAN, an e-nodeB, a PS network, a CS network, a base station subsystem for the CS network, and an IMS, as in FIG. 1. In this case, the IMS includes an Access Transfer Control Function (ATCF) and an Access Transfer GateWay (ATGW), in addition to a CSCF and an SCCAS. Although the ATCF and the ATGW are illustrated as one node (an ATCF/ATGW 320) in FIGS. 3 and 4, they may be illustrated as independent nodes. In FIG. 3, the nodes in the IMS may be collectively referred to as an "IMS node 310".

It is assumed that, in FIG. 3, the UEs 100 and 102 are initially connected to the PS network (however, a wireless access network, a base station, and a PS network at the UE 102 side are not illustrated). That is, it is assumed that the UEs 100 and 102 are performing a VoLTE call with each other. In this case, it is assumed that, in the middle of the call, the UE 100 performs handover (HO) to the CS network.

Paths A, B, C, and D denoted by solid lines in FIG. 3 represent paths through which call data passes. Reference numerals 300, 302, 304, and 306 denoted by dashed lines in FIG. 3 represent paths through which signaling in an eSRVCC handover process passes.

FIG. 4 is a sequence chart illustrating an operation of eSRVCC handover. The UEs 100 and 102 are initially connected to the PS network (e-UTRAN). In the system for realizing the eSRVCC handover, in the ATCF/ATGW 320, the ATCF anchors signaling of the IMS (IMS signaling), and the ATGW anchors call data. When a call between the UE 100 and the UE 102 is started, the ATCF relays IMS signaling for starting the call, and when the ATCF determines that the ATGW needs to anchor call data, the ATGW is assigned as an anchor point for the call data. As a result, the call data between the UE 100 and the UE 102 is transmitted/received through the paths A and B.

When the UE 100 attempts to move away from the coverage area of the e-UTRAN, the e-nodeB detects the movement and exchanges signaling (signaling 300 illustrated in FIG. 3) with the RNC/nodeB via the MME and the MSC/MGW 110 (ST300 illustrated in FIG. 4). In ST300, a data path in the CS network is prepared between the nodeB and the MSC/MGW 110, and when the preparation is finished, a command (HO Command) for handover to the UTRAN (CS network) is issued from the MME to the UE 100 via the e-nodeB.

Simultaneously with the process in ST300, the MSC/MGW 110 transmits signaling to the ATCF. As a result, the ATCF issues an instruction for path switching to the ATGW, so that the call-data transmission/reception destination of the ATGW is switched from the UE 100 to the MSC/MGW 110 (signaling 302 illustrated in FIG. 3, and ST302 illustrated in FIG. 4). That is, the path C is established. Also, when the processing for switching the path to the ATGW is completed, the ATCF transmits notification signaling (signaling 302 illustrated in FIG. 3) to the SCC-AS (ST302 illustrated in FIG. 4).

After handover to the UTRAN, the UE 100 exchanges signaling (signaling 304 illustrated in FIG. 3) with the MSC/MGW 110 via the RNC/nodeB (ST304 illustrated in FIG. 4). As a result, the path D is established.

After the path is established, the MSC/MGW 110 exchanges signaling (signaling 306 illustrated in FIG. 3) with the P-GW/S-GW via the MME (ST306 illustrated in FIG. 4). As a result, the path B is deleted.

The above description has been given of the operation of the eSRVCC handover.

Next, a description will be given of voice codecs used for 3GPP voice calls.

Examples of codecs based on the 3GPP standards include Adaptive Multi-Rate (AMR) codec, which is narrowband (NB) multi-rate codec described in 3GPP TS26.071 v12.0.0 "Mandatory speech CODEC speech processing functions; AMR speech Codec; General description" (hereinafter may be referred to as "Non-Patent Document 3"), and an Adaptive Multi-Rate Wideband (AMR-WB) codec, which is a wideband (WB) multi-rate codec described in 3GPP TS26.171 v12.0.0 "Speech codec speech processing functions; Adaptive Multi-Rate—Wideband (AMR-WB) speech codec; General description" (hereinafter may be referred to as "Non-Patent Document 4"). The AMR codec and the AMR-WB codec employ a Code-Exited Linear Predictive (CELP) system. The AMR codec and the AMR-WB codec are also robust against both bit errors that can occur on transmission paths in a CS network and so on and packet loss that can occur in a PS network, and thus can be used in both a CS network and a PS network.

An Enhanced Voice Service (EVS) codec described in 3GPP TS 26.441 v12.1.0 "Codec for Enhanced Voice Services (EVS); General overview" (hereinafter may be referred to as "Non-Patent Document 5") is available as another codec based on the 3GPP standards. The EVS codec is a multi-rate codec that supports a super wideband (SWB) and a fullband (FB), in addition to a narrowband and a wideband, and also supports bit rates of 5.9 kbps to 128 kbps. The EVS codec also supports an AMR-WB compatible mode (an EVS AMR-WB compatible mode), in addition to the above-described EVS-original codec mode (EVS primary mode). Since the EVS primary mode in the EVS codec is adapted only for use in a PS network and does not consider bit errors, a Modified Discrete Cosine Transform (MDCT) system incorporating a system using arithmetic coding that gives priority to the encoding efficiency is used in addition to the CELP system. However, support of the EVS codec in a CS network has also been discussed since September in 2014 (e.g., see SP-140485, 3GPP Work Item Description, "Support of EVS in 3G Circuit-Switched Networks" (hereinafter may be referred to as "Non-Patent Document 6")).

The narrowband (NB) codec refers to a codec that performs encoding and decoding processing on digital sound signals sampled at 8 kHz. Although the narrowband codec typically has a frequency band of 300 Hz to 3.4 kHz, the frequency band is not limited thereto and may be any band in the range of 0 to 4 kHz.

The wideband (WB) codec refers to a codec that performs encoding and decoding processing on digital sound signals sampled at 16 kHz. Although the wideband codec typically has a frequency band of 50 Hz to 7 kHz, the frequency band is not limited thereto and may be any band in the range of 0 to 8 kHz.

The super wideband (SWB) codec refers to a codec that performs encoding and decoding processing on digital sound signals sampled at 32 kHz. Although the super wideband codec typically has a frequency band of 50 Hz to 14 kHz, the frequency band is not limited thereto and may be any band in the range of 0 to 16 kHz.

The fullband (FB) codec refers to a codec that performs encoding and decoding processing on digital sound signals sampled at 48 kHz. Although the super wideband codec typically has a frequency band of 20 Hz to 20 kHz, the frequency band is not limited thereto and may be any band in the range of 0 to 24 kHz.

The multi-rate codec refers to a codec that supports a plurality of bit rates.

The "band (or bandwidth)" as used herein refers to a band of signals input to or output from a codec.

The "codec mode" as used herein means a subset of elements that constitute a codec. The elements include, for example, a bit rate or a band and the EVS primary mode, the EVS AMR-WB compatible mode, and so on in the EVS codec.

In FIG. 1 or 3, when the UE 100 performs handover from the PS network to the CS network, a codec used by the UE 100 is re-set to a codec supported by the CS network. The codec that is re-set in this case may be different from the codec that the UE 100 uses in the PS network, or even when the codecs are the same, a mode (a bit rate, an audio band, or the like) supported by the CS network may be different from a mode supported by the PS network.

However, no sufficient study has yet been conducted on an operation when the codec or codec mode that is re-set during handover of UE from the PS network to the CS network differs from a codec or a codec mode used in the PS network.

SUMMARY

One non-limiting and exemplary embodiment provides a communication node, a terminal, and a communication control method that can continue a communication through suppression of call-quality deterioration, even when a codec used by one of terminals that are communicating with each other is re-set.

In one general aspect, the techniques disclosed here feature a communication node that determines a codec and a codec mode to be used by two terminals that perform communication in a first network, when one of the two terminals performs handover to a second network that is different from the first network. The communication node includes: a determiner that sets common part for a codec and a codec mode to be used by the two terminals, the common part being common among information indicating codecs and codec modes used for communication in the first network, information indicating codecs and codec modes supported by the one terminal, and information indicating codecs and codec modes supported by the second network; and a generator that generates signaling for requesting the two terminals to perform changing to the set codec and codec mode to be used by the two terminals.

According to one aspect of the present disclosure, it is possible to continue a communication through suppression of call-quality deterioration, even when a codec used by one of terminals that are communicating with each other is re-set.

It should be noted that general or specific embodiments may be implemented as a system, an apparatus, a device, a method, an integrated circuit, a computer program, or a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a sequence chart illustrating one example of an operation according to the first embodiment;

FIG. 7 illustrates one example of an SDP offer and an SDP answer according to the first embodiment;

FIG. 8 illustrates one example of a result of comparison between codecs supported by UE in an MSC/MGW according to the first embodiment and codecs and codec modes supported by a CS network;

DETAILED DESCRIPTION

Background that LED to Aspect According to Present Disclosure

Figure 1:
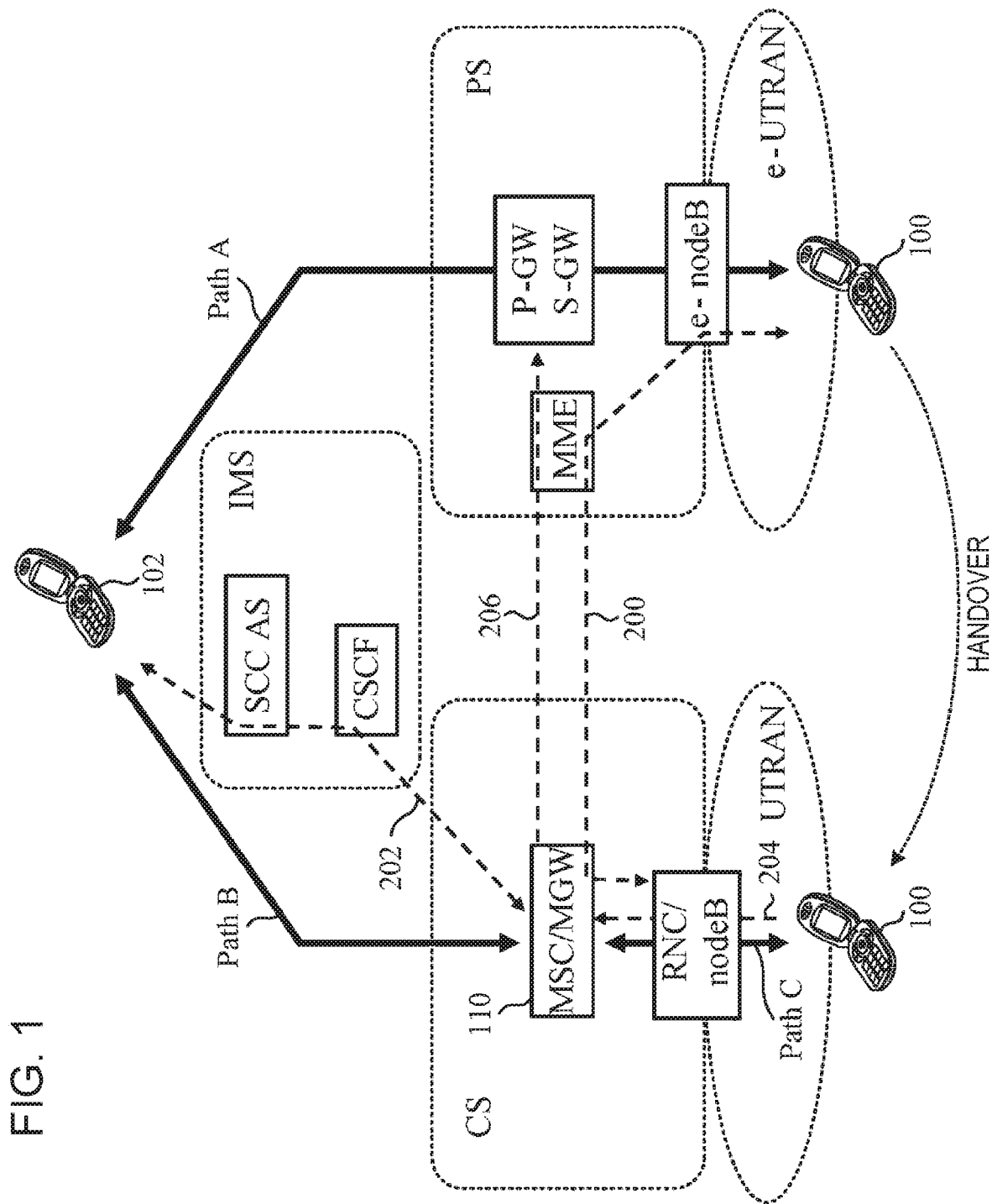
FIG. 1 is a block diagram illustrating a portion of a 3GPP mobile communications network.
Figure 3:
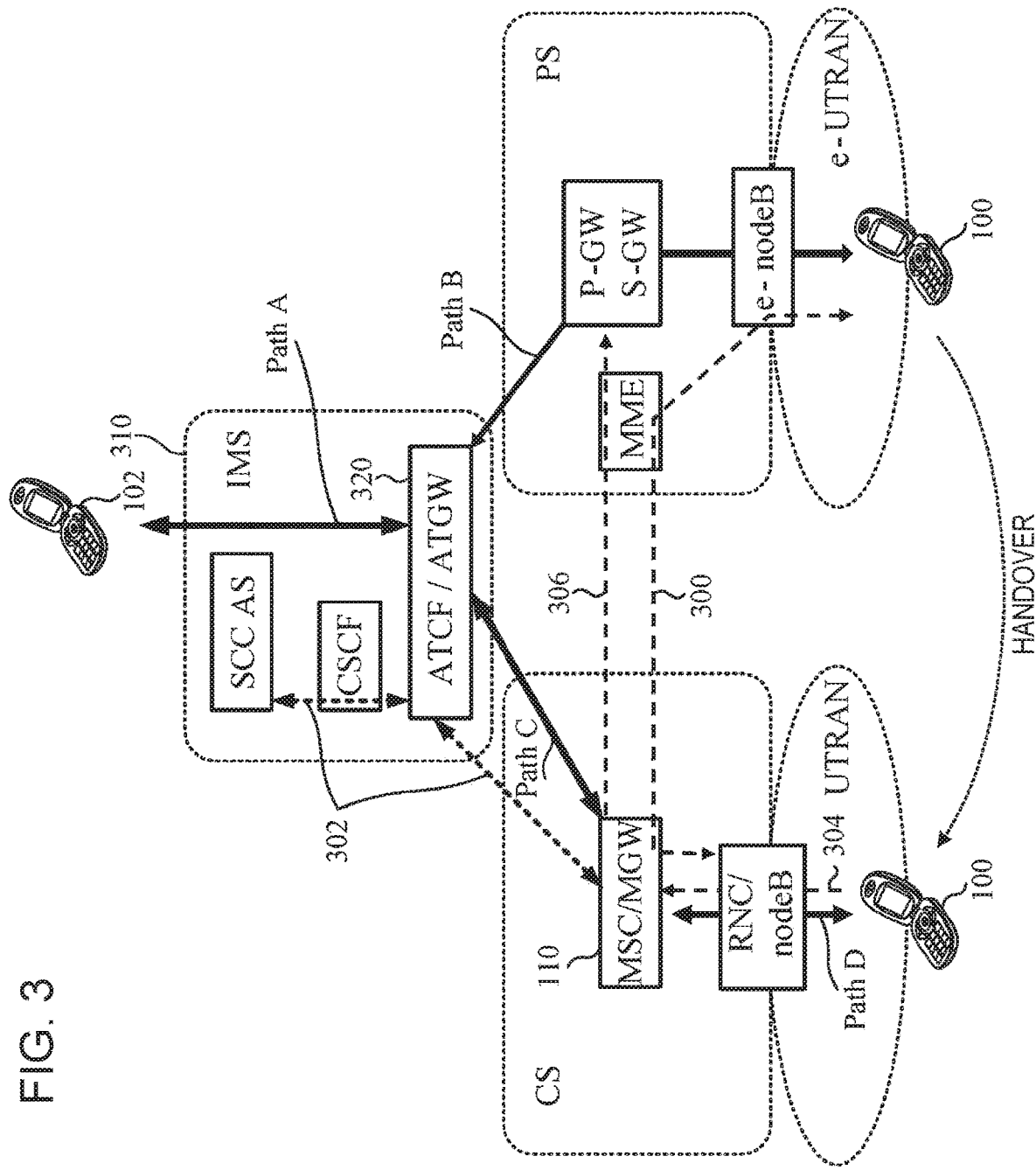
FIG. 3 is a block diagram illustrating a portion of a 3GPP mobile communications network that enables eSRVCC.

In FIG. 1 or 3, in order to allow a call between the UE 100 and the UE 102 to be continued when the UE 100 performs handover from the PS network to the CS network, the following two methods are conceivable. A first method is a method for performing transcoding in the MSC/MGW 110 or the ATCF/ATGW 320. A second method is a method for making the codec used by the UE 102 same as a post-change codec of the UE 100.

With the former method for performing transcoding, the call quality declines owing to the transcoding.

On the other hand, with the latter method for changing the codec, although the call quality does not deteriorate, unlike the method for performing transcoding, it takes time for signaling for changing the codec of the UE 102, and the time in which a call is interrupted increases. Thus, the latter method is not desirable. In addition, in eSRVCC handover, signaling for path switching during handover of the UE 100 is terminated by the ATCF, and thus even sending signaling for changing the codec of the UE 102 is not possible. That is, in the eSRVCC handover, the codec of the UE 102 cannot be changed using signaling that is currently used.

Figure 2:
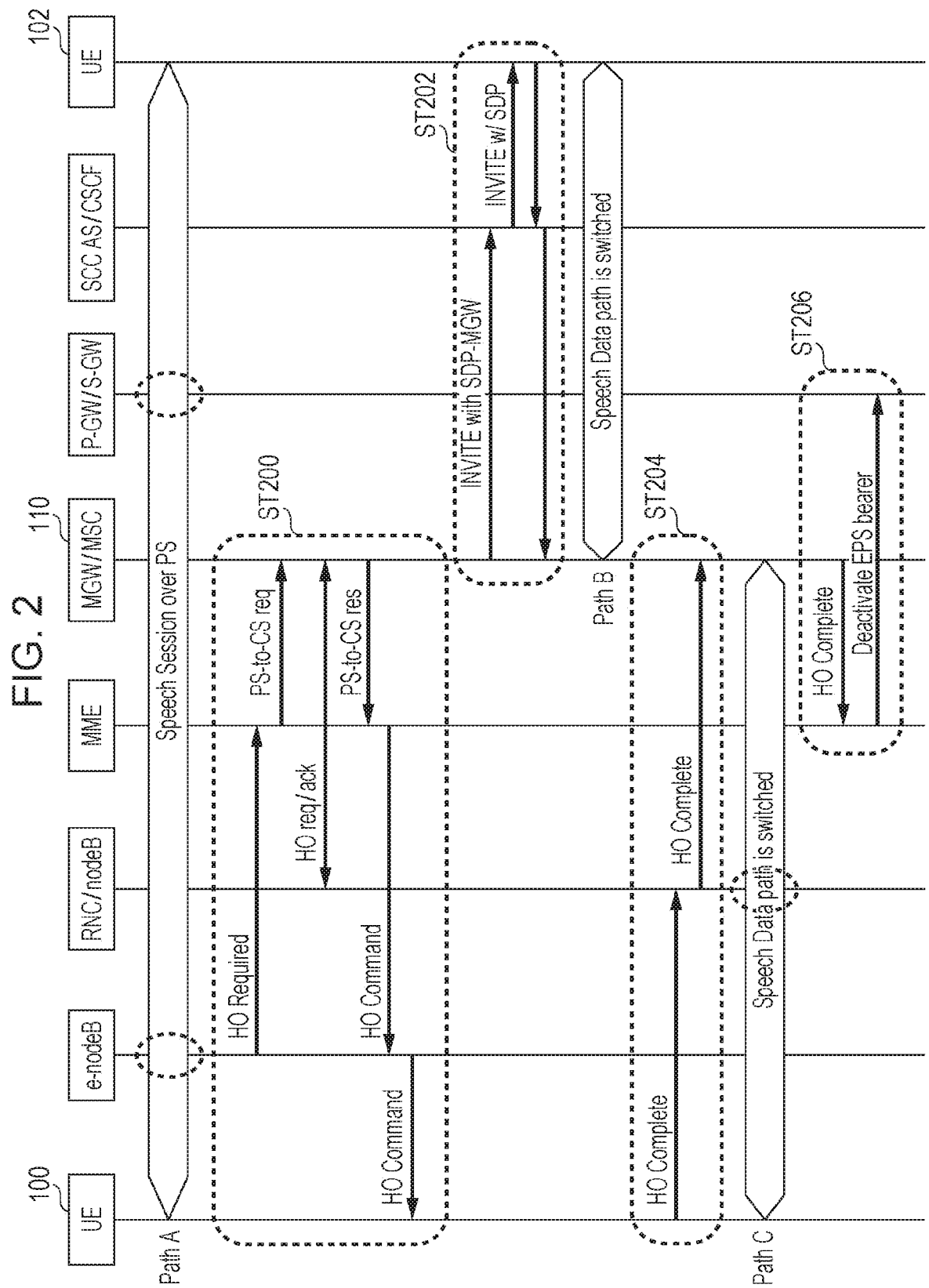
FIG. 2 is a sequence chart illustrating an operation of SRVCC handover.
Figure 4:
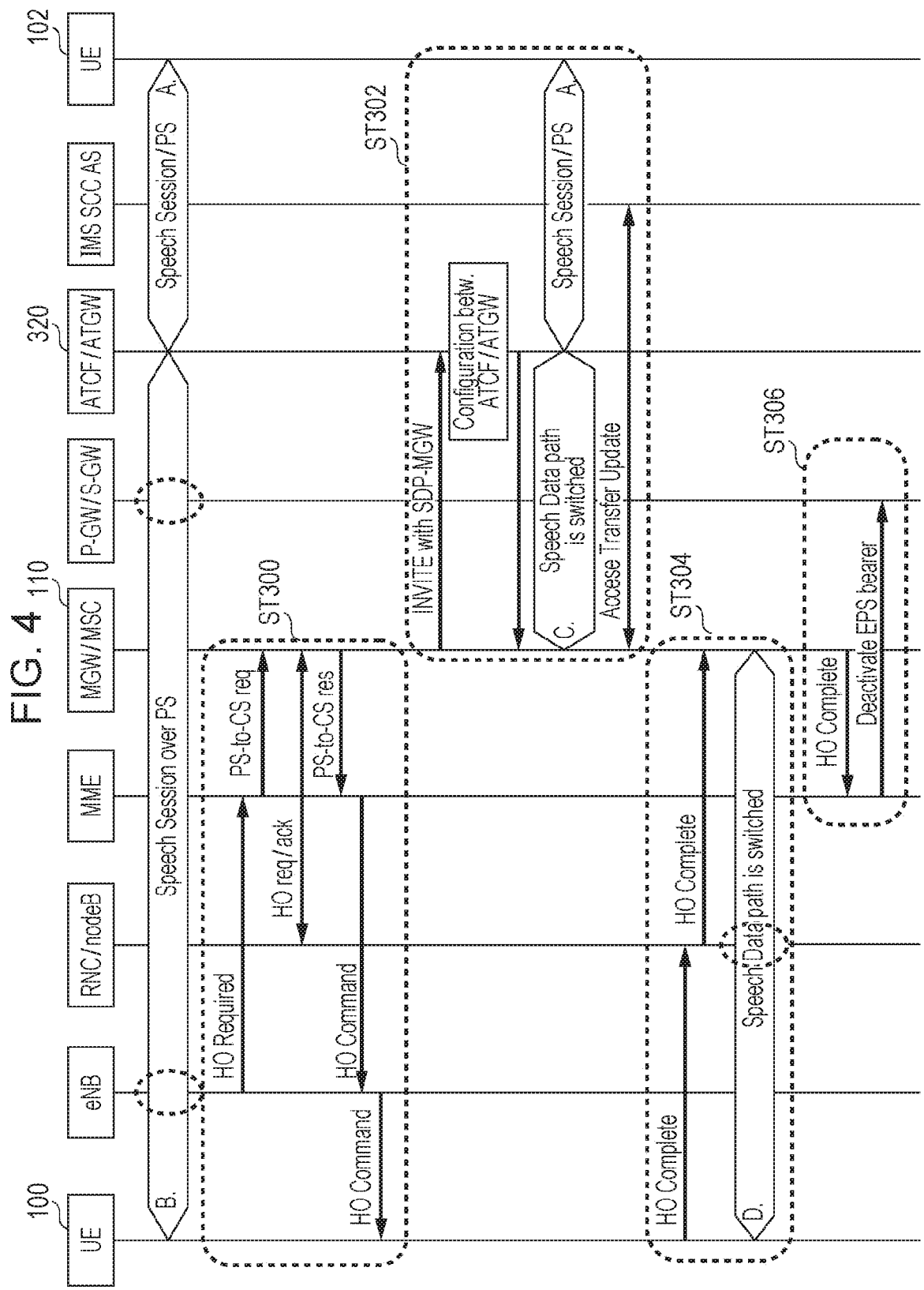
FIG. 4 is a sequence chart illustrating an operation of eSRVCC handover.

International Publication No. 2013/156063 (hereinafter may be referred to as "Patent Document 1") discloses a method in which, when an MSC/MGW receives a PS-to-CS req message (see FIG. 2 or 4) from an MME in the process of SRVCC or eSRVCC handover, UE pre-determines a codec to be used in a CS network, on the basis of information included in the message The information included in the message is, for example, information indicating codecs supported by UE that performs handover and information received from the IMS side (an SCCAS or ATCF/ATGW) and indicating a codec that the UE uses for communication in a PS network.

When this method is used, the MSC/MGW can know the codec that the UE uses in the PS network, before determining a codec that the UE is to use in the CS network. Thus, when a codec and a codec mode used in the PS network can also be supported in the CS network, a codec and a codec mode in the CS network can be made to match those in the PS network, and thus this method is useful.

However, Non-Patent Document 1 does not disclose any solution to a case in which the codec and the codec mode used in the PS network cannot be supported in the CS network. Hence, when the codec and the codec mode used in the PS network cannot be supported in the CS network, there is a problem in that the quality of a codec and a codec mode negotiated during start of a session in the PS network cannot be ensured in the CS network.

A second problem is that, when an EVS codec is used in the CS network, decoding cannot be correctly performed owing to bit errors that occur on a transmission path, and quality deterioration occurs, depending on the encoding system.

3GPP TS26.201 v12.0.0 "Speech codec speech processing functions; Adaptive Multi-Rate—Wideband (AMR-WB) speech codec; Frame structure" (hereinafter may be referred to as "Non-Patent Document 7") discloses an error detecting method in which when an AMR-WB codec is used in a CS network, a cyclic redundancy check (CRC) is added to bits that are not robust against bit errors, IETF RFC 4867 "RTP Payload Format and File Storage Format for the Adaptive Multi-Rate (AMR) and Adaptive Multi-Rate Wideband (AMR-WB) Audio Codecs" (hereinafter may be referred to as "Non-Patent Document 8") discloses a method in which, when an error occurs in a CS network in which an AMR codec or an AMR-WB codec is used, and a frame including the error is transmitted to a PS network, a notification indicating that the frame is erroneous is issued to a terminal in the PS network by using a Q bit, speech lost, or the like.

Use of the above-described methods allows a terminal in the PS network to discard an erroneous frame without decoding it. However, for a system using arithmetic coding that gives priority to the encoding efficiency, the system being used in some EVS codecs, the majority of encoded bits are not robust against errors, thus reducing the effectiveness of the above-described system using the CRC.

Accordingly, in one aspect of the present disclosure, even when a codec and a codec mode used in a PS network cannot be supported by the CS network, the quality (i.e., call quality) of a codec and a codec mode negotiated at the start of a session in the PS network is ensured in the CS network. In addition, even when a codec (a codec utilizing a system (algorithm) that is not robust against bit errors) is used in a network (e.g., a CS network) in which bit errors can occur, a communication can be continued through suppression of quality deterioration.

Embodiments of the present disclosure will be described below in detail with reference to the accompanying drawings.

First Embodiment

Figure 5:
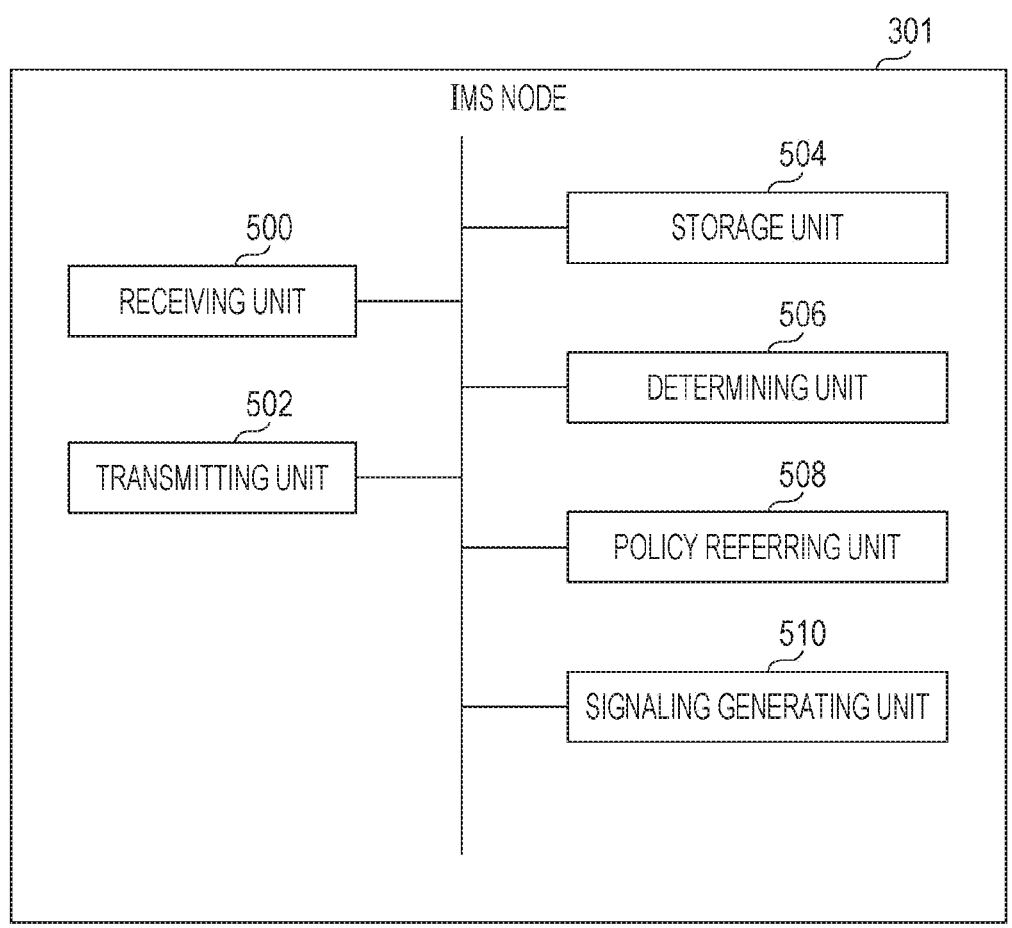
FIG. 5 is a block diagram illustrating the configuration of an IMS node according to a first embodiment.

FIG. 5 is a block diagram illustrating the configuration of an IMS node 310 according to a first embodiment. The term "IMS node" refers to, for example, an SCCAS or an ATCF/ATGW.

The IMS node 310 includes a receiving unit 500, a transmitting unit 502, a storage unit 504, a determining unit 506, a policy referring unit 508, and a signaling generating unit 510. The IMS node 310 also has functions of a typical IMS node, in addition to the constituent elements illustrated in FIG. 5.

The receiving unit 500 receives signaling. Examples of the signaling received by the receiving unit 500 include information indicating a Session Description Protocol (SDP) offer and an SDP answer in call control (session setup) at the start of communication in the PS network or information indicating part of the SDP offer and the SDP answer (i.e., information indicating codecs and codec modes that terminals use for communication in the PS network), information indicating codecs and codec modes supported by a terminal that performs handover to the CS network, and information indicating codecs and codec modes supported by the CS network.

Instead of the information indicating codecs and codec modes supported by a terminal that performs handover to the CS network and the information indicating codecs and codec modes supported by the CS network, the receiving unit 500 may receive, from the CS network (e.g., the MSC/MGW 110), information (codec and codec-mode information) indicating codecs and codec modes that match between the information indicating codecs and codec modes supported by a terminal that performs handover to the CS network and the information indicating codecs and codec modes supported by the CS network.

The transmitting unit 502 transmits signaling. The signaling transmitted by the transmitting unit 502 includes, for example, a codec-mode change request (a mode change request) for requesting change of a codec mode.

The storage unit 504 stores therein the contents of an SDP offer and an SDP answer output from the receiving unit 500. Specifically, the contents of the SDP offer and SDP answer are information about codecs and codec modes used in the PS network.

When SRVCC handover or eSRVCC handover occurs, the determining unit 506 performs comparison among a codec and a codec mode that a terminal (in FIG. 1 or 3, the UE 100) that performs handover uses for communication in the PS network, codecs and codec modes supported by the terminal, and codecs and codec modes supported by the CS network, which is a handover target. On the basis of a result of the comparison of the codecs and codec modes and a policy referred to by the policy referring unit 508 (described below), the determining unit 506 determines whether or not the codec and the codec mode need to be changed.

The policy referring unit 508 refers to a policy held by a service operator.

When the determining unit 506 determines that the codec mode needs to be changed, the signaling generating unit 510 generates signaling including a codec-mode change request. The signaling generating unit 510 outputs the generated signaling to the transmitting unit 502.

FIG. 6 is a sequence chart illustrating one example of an operation according to the present embodiment.

In FIG. 6, the UE 100 is initially present in the PS network (LTE network), performs, via the IMS node 310, session setup with the UE 102 that is also present in the PS network (LTE network) (e.g., see Non-Patent Document 2), and determines a codec and a codec mode to be used for voice communication by using an SDP offer and an SDP answer (ST601).

In this case, the IMS node 310 (the storage unit 504) stores therein information of an SDP offer and an SDP answer exchanged between the terminals in the session setup or part (e.g., the contents of the SDP answer) of the information (ST602).

FIG. 7 illustrates one example of the SDP offer and the SDP answer exchanged between terminals in session setup. In the example illustrated in FIG. 7, in codec negotiation, UE that has received the SDP offer selects a range (br=9.6-24.4) of bit rates of 9.6 kbps to 24.4 kbps, the range being a super wideband (SWB) (bw=swb) of the EVS codec, and writes the selected codec mode to the SDP answer. The storage unit 504 in the IMS node 310 stores at least the contents of the SDP answer.

When the UE 100 is performing a voice call with the UE 102 over the PS network (LTE network) (ST603), the UE 100 performs SRVCC handover or eSRVCC handover from the PS network to the CS network.

Specifically, when the UE 100 attempts to move away from the coverage area of the e-UTRAN in the process of SRVCC handover or eSRVCC handover, the e-nodeB detects the movement and transmits an HO Required message to the MME (ST604), and the MME transmits a PS-to-CS req message to the MSC/MGW 110 (ST605). In FIG. 6, the HO Required message and the PS-to-CS req message are the same as those described in Non-Patent Document 1. For example, the PS-to-CS req message includes a list (a Supported Codec List) indicating codecs (UE supported codecs) supported by the UE 100.

Upon receiving the PS-to-CS req message, the MSC/MGW 110 verifies (compares) the list of codecs supported by the UE 100, the list being included in the PS-to-CS req message, against (with) the codecs and codec modes supported by the local network (CS network) (ST606). The MSC/MGW 110 transmits a result of the verification and codec and codec-mode information indicating matching codecs and codec modes to the IMS node 310 (ST607). The codec and codec-mode information may be transmitted, for example, using an SDP for an IMS or may be transmitted using another method.

FIG. 8 illustrates one example of a result of verification (comparison) between codecs in the MSC/MGW 110 which are supported by the UE 100 and codecs and codec modes supported by the CS network. That is, the information illustrated in FIG. 8 is information indicating codecs and codec modes that match between information indicating the codecs and codec modes supported by the UE 100 that performs handover to the CS network and information indicating the codecs and codec modes supported by the CS network.

On the basis of the codec and codec-mode information received from the MSC/MGW 110, the contents of the SDP offer and DP answer stored in the storage unit 504 (or part of the contents), and the policy held by the service operator and referred to by the policy referring unit 508, the determining unit 506 in the IMS node 310 determines a codec and a codec mode to be used in the CS network (i.e., a codec and a codec mode to be used by the UE 100) and a codec and a codec mode to be used in the PS network (i.e., a codec and a codec mode to be used by the UE 102) (ST608). Details of determination processes in the determining unit 506 are described later.

The IMS node 310 then issues an instruction indicating the determined codec and codec mode to the MSC/MGW 110 (ST609). Also, during transmission of an HO Req message to the CS network side (the RNC/nodeB), the MSC/MGW 110 issues a notification for selecting the codec and the codec mode indicated by the instruction issued from the IMS node 310 (ST610).

A data path in the CS network is prepared between the nodeB and the MSC/MGW 110, and when the preparation is finished, a command (HO Command) for performing handover to the UTRAN (the CS network) is issued from the MME to the UE 100 via the e-nodeB (ST611).

Initiation of IMS session transfer is performed between the MSC/MGW 110 and the IMS node 310 (ST612).

After the handover to the UTRAN (the CS network), the UE 100 exchanges signaling with the MSC/MGW 110 via the RNC/nodeB (ST613). As a result, the communication path between the UE 100 and the MSC/MGW 110 is switched.

A command for switching the communication path of call data of the UE 102 from the UE 100 to the MSC/MGW 110 is issued, so that the communication path is switched (ST614).

The IMS node 310 also issues, to the UE 102 in the PS network, a mode change request for requesting changing to the codec mode determined in ST608 (ST615).

The mode change request to the PS network (ST615) may also be issued immediately after the data communication path is changed (the speech data path is switched), as illustrated in FIG. 6, or may be performed before the data communication path is changed.

The mode change request may be included in a Real-time Transport Protocol (RTP) payload header or an RTP Control Protocol (RTCP). For example, the mode change request may be issued using a Codec Mode Request (CMR) byte in an RTP payload format header described in 3GPP T526.445 v12.2.0 "Codec for Enhanced Voice Services (EVS); Detailed algorithmic description" (hereinafter may be referred to as "Non-Patent Document 9"), may be issued using a CMR in an RTP Control Protocol (RTCP)-APP described in 3GPP TS26.114 v12.9.0 "IP Multimedia Subsystem (IMS); Multimedia Telephony; Media handling and interaction" (hereinafter may be referred to as "Non-Patent Document 10"), or may be issued using another method.

Also, in FIG. 6, upon receiving an instruction from the IMS node 310, a node that exists on the data path may transmit the mode change request to the UE 102. For example, the node on the data path may be the ATGW or the MGW. For example, when the ATGW issues the mode change request by using a CMR byte in an RTP payload format header, the ATGW adds the CMR byte including the mode change request to data transmitted from the MGW.

Figure 9:
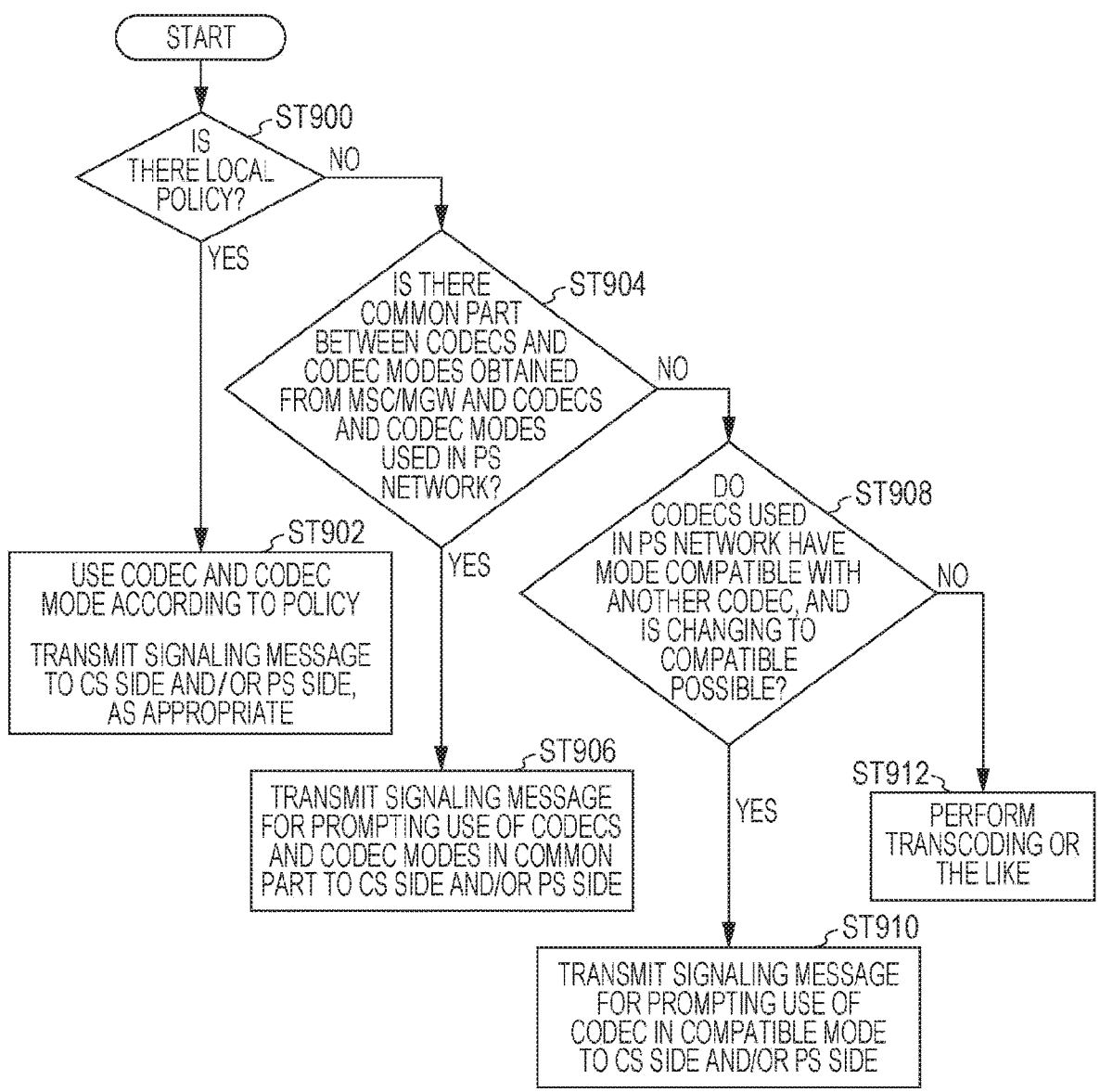
FIG. 9 is a flowchart illustrating one example of determinations made by a determining unit according to the first embodiment.

Next, determinations made by the determining unit 506 in the IMS node 310 will be described in detail. FIG. 9 is a flowchart illustrating one example of determinations made by the determining unit 506.

The determining unit 506 first determines whether or not there is a policy (local policy) of a service operator, the policy being referred to by the policy referring unit 508 (ST900). When there is a policy of a service operator (YES in ST900), the determining unit 506 determines that a codec and a codec mode according to the policy are to be used (ST902). The IMS node 310 transmits a signaling message indicating the codec and codec mode to the CS network side and/or the PS network side, as appropriate.

One example of content of the policy of the service operator is that "When a codec used by the PS network is also supported by the CS network, the codec mode negotiated during session setup in the PS network may be overwritten with a codec mode of the CS network side", For example, when the SDP answer illustrated in FIG. 7 is compared with the verification result illustrated in FIG. 8, an EVS bit rate negotiated during session setup and written in the SDP answer (illustrated in FIG. 7) is in the range of 9.6 to 24.4 kbps, whereas EVS bit rates (illustrated in FIG. 8) supported by the CS network are 5.9 to 13.2 kbps. When the above-described policy is to be followed, the IMS node 310 instructs the MSC/MGW 110 to select an EVS bit rate of 5.9 kbps to 13.2 kbps, and during transmission of an HO Req to the CS network, the MSC/MGW 110 issues a notification for selecting an EVS bit rate of 5.9 kbps to 13.2 kbps (ST610). The IMS node 310 also issues, to the PS network, a notification for setting the upper limit of the bit rates to 13.2 kbps (ST615).

On the other hand, if there is no policy of a service operator (NO in ST900), the determining unit 506 determines whether or not there is common part between the codecs and codec modes indicated by the codec and codec-mode information (ST607) reported from the MSC/MGW 110 and codecs and codec modes used in the PS network (ST904).

If there is common part (YES in ST904), the determining unit 506 determines that the codecs and the codec modes included in the common part are to be used (ST906). The IMS node 310 transmits a signaling message for prompting use of the codecs and codec modes in the common part to the CS network side and/or the PS network side.

For example, when the SDP answer illustrated in FIG. 7 is compared with the verification result illustrated in FIG. 8, the common part of the EVS bit rates includes 9.6 kbps and 13.2 kbps. Accordingly, the IMS node 310 instructs the MSC/MGW 110 to use only 9.6 kbps and 13.2 kbps as the EVS bit rates, and during transmission of an HO Req to the CS network side, the MSC/MGW 110 issues an instruction for selecting only 9.6 kbps and 13.2 kbps as EVS bit rates (ST610). The IMS node 310 also issues, to the PS network side, a notification for setting bit rates of 9.6 kbps and 13.2 kbps (ST615).

The process in ST906 illustrated in FIG. 9 is equivalent to the process performed in ST902 when the policy that was confirmed to exist in the determination made in ST900 has content "When the codec used at the PS network side is also supported by the CS network side, the common part is to be used as the codec mode".

The common part may also be a common upper-limit value, rather than a completely matching part. For example, when the SDP answer illustrated in FIG. 7 is compared with the verification result illustrated in FIG. 8, the upper limit of the EVS bit rates is 13.2 kbps, and thus a notification for setting the upper limit of the bit rates to 13.2 kbps may be transmitted to the PS network side. Also, there are also cases in which the combinations of bit rates used at the CS network side are pre-set to several combinations, as described in 3GPP TS26.103 v12.0.0 "Speech codec list for GSM and U MTS (hereinafter may be referred to as "Non-Patent Document 11"). For example, even in the case of EVS, for example, a combination of 8.0 kbps, 9.6 kbps, and 13.2 kbps is assumed to be supported in addition to the combination illustrated in FIG. 8, that is, a combination of 5.9 kbps, 7.2 kbps, 8.0 kbps, 9.6 kbps, and 13.2 kbps. In this case, the latter combination that is closer to the lower-limit value of the bit rates negotiated in the PS network, that is, the combination of 8.0 kbps, 9.6 kbps, and 13.2 kbps may be selected.

On the other hand, if there is no common part between the codecs and codec modes indicated by the codec and codec-mode information and the codecs and codec modes used in the PS network (NO in ST904), and the codecs used in the PS network have a mode compatible with another codec, the determining unit 506 determines whether or not the compatible codec exists in the codecs and codec modes indicated in the codec and codec-mode information (ST908). That is, if the codecs used in the PS network have a compatible mode, the determining unit 506 determines whether or not changing to the compatible mode is possible in the CS network.

If changing to the compatible mode is possible in the CS network (YES in ST908), the determining unit 506 determines that the codec in the compatible mode is to be used (ST910). The IMS node 310 transmits a signaling message for prompting use of the codec in the compatible mode to the CS network and/or the PS network (ST610, ST615).

As described above, the EVS codec also supports the AMR-WB compatible mode. Accordingly, in ST910, the IMS node 310 instructs the MSC/MGW 110 to use the AMR-WB compatible mode of the EVS, and during transmission of the HO Req to the CS network, the MSC/MGW 110 issues a notification for changing to the AMR-WB compatible mode of the EVS (ST610). The IMS node 310 also issues, to the PS network, a notification for setting the AMR-WB compatible mode of the EVS and setting the upper limit of bit rates to 12.65 kbps (see FIG. 8) (ST615).

The process in ST910 illustrated in FIG. 9 is equivalent to the process performed in ST902 when the policy that was confirmed to exist in the determination made in ST900 has content "When the codec used at the PS network side has a compatible mode with another codec, the codec is to be changed to the compatible mode in the CS network".

On the other hand, if the codecs used in the PS network do not have a compatible mode with another codec, or if changing to the compatible mode is not possible in the CS network (NO in ST908), the determining unit 506 determines that the codec supported in the CS network is to be used in the CS network and transcoding is to be performed between the PS network and the CS network (ST912).

The process in ST912 illustrated in FIG. 9 is equivalent to the process performed in ST902 when the contents of the policy that was confirmed to exist in the determination in ST900 has content "Transcoding is to be performed".

Also, in ST912, re-negotiation of the session may be performed instead of the transcoding, and in accordance with a result of the re-negotiation, the codec of the UE 102 may be changed to a codec that can be supported in the CS network.

The transcoding may be performed when a node that exists on the data path receives, from the IMS node, an instruction for performing transcoding. For example, the node that performs transcoding may be the ATGW or the MGW.

The above description has been given of determinations made by the determining unit 506 in the IMS node 310.

As described above, when one of two terminals that perform communication in the PS network performs handover to the CS network, the determining unit 506 in the IMS node 310 sets, for a codec and a codec mode to be used by the two terminals, common part among information indicating codecs and codec modes used for communication in the PS network, information indicating codecs and codec modes supported by the terminal (the UE 100) that performed the handover, and information indicating codecs and codec modes supported by the CS network. The signaling generating unit 510 in the IMS node 310 then generates signaling for requesting the two terminals to perform changing to the set codec and codec mode to be used by the two terminals.

As described above, in the present embodiment, the use of the codecs and codec modes in the common part allows the quality of a codec and a codec mode negotiated at the start of a session in the PS network to be ensured in the CS network, even when the codecs and the codec modes used in the PS network cannot be supported in the CS network.

If there is no common part, the codecs used in communication in the PS network have a mode compatible with another codec, and both codecs supported by one terminal that has performed handover and codecs supported by the CS network include the other codec, then the determining unit 506 in the IMS node 310 sets the other codec or the mode compatible with the other codec as the codec and codec mode to be used by the two terminals.

In addition, in the present embodiment, when there is a policy of a service operator, the codec and the codec mode are set according to the policy.

Thus, according to the present embodiment, even when codecs and codec modes supported by the CS network, which is the handover target of UE, differ from a codec and a codec mode negotiated during session setup at the time of communication in the PS network, it is possible to continue the communication without departing from the policy of the service operator and what was negotiated during the session setup.

Hence, in the present embodiment, even when the codec used by one of terminals that are performing communication is re-set, it is possible to continue the communication through suppression of call-quality deterioration.

Second Embodiment

Although the description in the first embodiment has been given of a case in which the IMS node 310 determines a codec to be used during terminal handover to the CS network, a description in a second embodiment will be given of a case in which the MSC/MGW 110 determines a codec to be used during terminal handover to the CS network.

Figure 10:
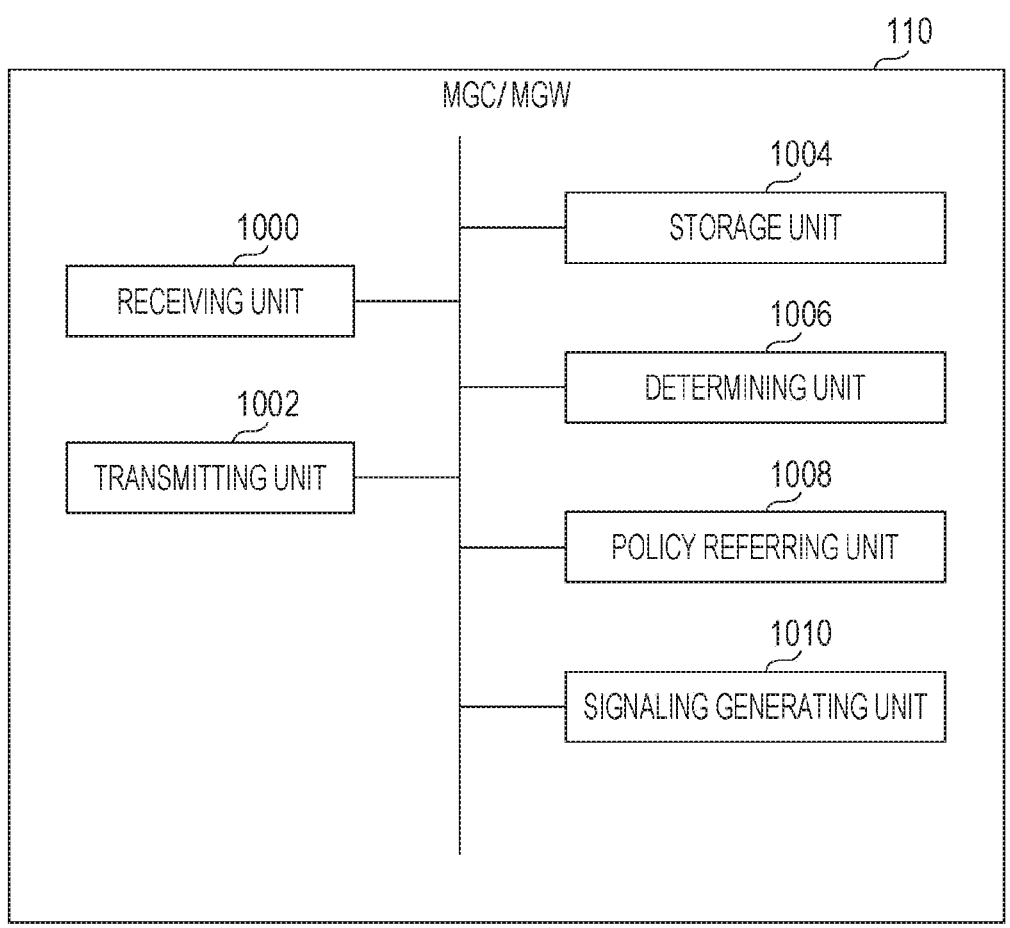
FIG. 10 is a block diagram illustrating the configuration of an MSC/MGW node according to a second embodiment.

FIG. 10 is a block diagram illustrating the configuration of the MSC/MGW 110 according to the present embodiment.

The MSC/MGW 110 includes a receiving unit 1000, a transmitting unit 1002, a storage unit 1004, a determining unit 1006, a policy referring unit 1008, and a signaling generating unit 1010. The MSC/MGW 110 also has functions of a typical MSC/MGW, in addition to the constituent elements illustrated in FIG. 10.

The receiving unit 1000 receives signaling. Examples of the signaling received by the receiving unit 1000 include information received from the IMS node 310 and indicating the contents of an SDP offer and an SDP answer in call control (session setup) at the start of communication in the PS network or information indicating part of the contents (i.e., information indicating codecs and codec modes that terminals use for communication in the PS network; this information is referred to as "codec and codec-mode information" in the present embodiment), and a PS-to-CS req message received from the MME and including a list indicating codecs supported by the UE 100.

The transmitting unit 1002 transmits signaling. The signaling transmitted by the transmitting unit 1002 includes, for example, a codec-mode change request (a mode change request) for requesting change of a codec mode and a query for requesting the IMS node 310 to transmit the codec and codec-mode information.

The storage unit 1004 stores therein the contents of an SDP offer and an SDP answer or part thereof and codec information transmitted from the CS network and supported by the UE 100, the SDP offer, the SDP answer, and the codec information being output from the receiving unit 1000. The storage unit 1004 may also store information indicating codecs and codec modes supported by the CS network.

When SRVCC handover or eSRVCC handover occurs, the determining unit 1006 performs comparison among a codec and a codec mode that the terminal (in FIG. 1 or 3, the UE 100) that performs handover uses for communication in the PS network, codecs and codec modes supported by the terminal, and codecs and codec modes supported by the CS network. On the basis of a result of the comparison of the codecs and codec modes and a policy referred to by the policy referring unit 1008 (described below), the determining unit 1006 determines whether or not the codec and the codec mode need to be changed.

The policy referring unit 1008 refers to a policy held by a service operator.

When the determining unit 1006 determines that the codec mode needs to be changed, the signaling generating unit 1010 generates signaling including a codec-mode change request. The signaling generating unit 1010 also generates, for the IMS node 310, signaling (a query) for receiving the contents of the SDP offer and SDP answer or part of the contents. The signaling generating unit 1010 outputs the generated signaling to the transmitting unit 502.

Figure 11:
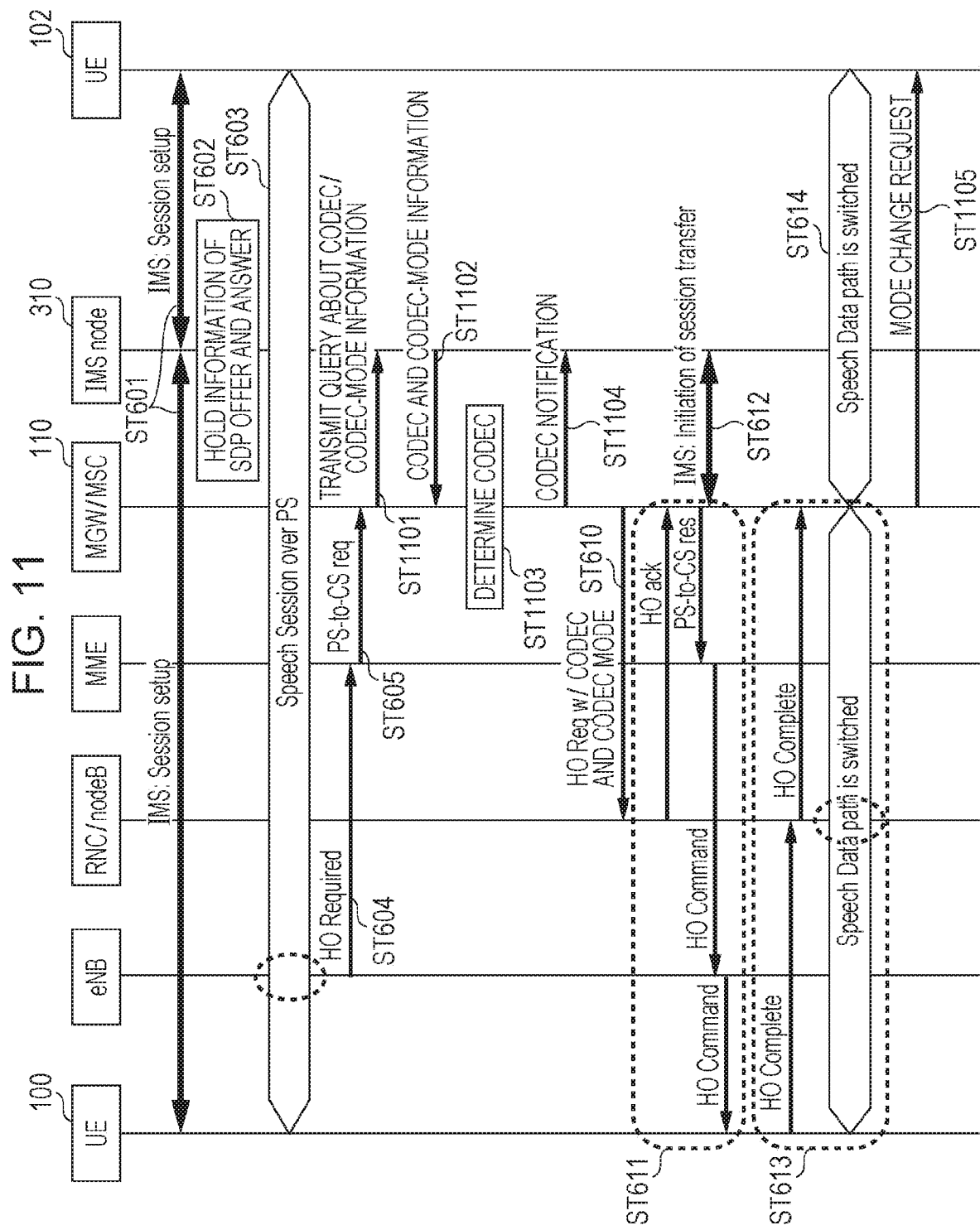
FIG. 11 is a sequence chart illustrating one example of an operation according to the second embodiment.

FIG. 11 is a sequence chart illustrating one example of an operation according to the present embodiment. In FIG. 11, processes that are substantially the same as those in the first embodiment (FIG. 6) are denoted by the same reference numerals, and descriptions thereof are not given hereinafter.

In FIG. 11, as in the first embodiment, the UE 100 is initially present in the PS network (LTE network) and is performing a voice call with the UE 102 that is also present in the PS network (LTE network).

The storage unit 1004 in the MSC/MGW 110 stores therein information (a supported codec list) indicating codecs supported by the UE 100, the information being included in a PS-to-CS req message received from the MME in ST605.

The signaling generating unit 1010 in the MSC/MGW 110 generates a query message for the IMS node 310, the query message requesting the contents of an SDP offer and an SDP answer exchanged between the UE 100 and the UE 102 in ST601 or part of the contents. The generated query message is transmitted from the MSC/MGW 110 to the IMS node 310 (ST1101). This query message may be transmitted using IMS signaling or another method.

Upon receiving the query message in ST1101, the IMS node 310 transmits codec and codec-mode information including the held contents of the SDP offer and SDP answer or the part thereof to the MSC/MGW 110 (ST1102). When the MSC/MGW 110 receives the codec and codec-mode information, the storage unit 1004 stores the codec and codec-mode information therein.

On the basis of the codec and codec-mode information received from the IMS node 310 (the codecs and codec modes used for communication in the PS network), the list of codecs supported by the UE 100, the codecs and codec modes supported by the local network (the CS network), and the policy held by the service operator and referred to by the policy referring unit 508, the determining unit 1006 in the MSC/MGW 110 determines a codec and a codec mode to be used in the CS network (i.e., a codec and a codec mode to be used by the UE 100) and a codec and a codec mode to be used in the PS network (i.e., a codec and a codec mode to be used by the UE 102) (ST1103).

Since determination processes in the determining unit 1006 are substantially the same as those in the first embodiment (e.g., see FIG. 9), descriptions thereof are not given hereinafter.

During transmission of an HO Req message to the CS network side (the RNC/nodeB), the MSC/MGW 110 issues a notification including the determined codecs and codec modes (ST610). The MSC/MGW 110 also issues, to the IMS node 310, a notification indicating the codec and the codec mode to be used in the PS network, the codec and the codec mode being included in the determined codecs and codec modes (ST1104). The notification indicating the codec and codec mode to the IMS node 310 may be issued using IMS signaling or another method.

The MSC/MGW 110 also issues, to the UE 102 in the PS network, a mode change request for requesting changing to the codec mode determined in ST1103 (ST1105).

The mode change request to the PS network (ST1105) may be issued immediately after a data communication path is changed (Speech Data path is switched), as illustrated in FIG. 11, or before the data communication path is changed.

The mode change request may be included in an RTP payload header or an RTCP. For example, the mode change request may be issued using the Codec Mode Request (CMR) byte in the RTP payload format header described in Non-Patent Document 9, may be issued using the CMR in the RTCP-APP described in Non-Patent Document 10, or may be issued using another method.

Also, in FIG. 11, the mode change request may be transmitted from the MSC/MGW 110 or the ATGW. For example, when the ATGW issues the mode change request by using a CMR byte in the RTP payload format header, the ATGW adds the CMR byte including the mode change request to data transmitted from the MGW.

Also, for example, when the policy of the service operator has content "Session re-negotiation is to be performed, and the codec at the PS network side is to be changed", the MSC/MGW 110 may transmit an SDP offer to the UE 102 via the IMS node 310 before determining a codec to be used in the PS network and may transmit an HO req message including the codec and codec mode to be used at the CS side, after receiving the SDP answer from the UE 102 via the IMS node 310.

As described above, when one of two terminals that perform communication in the PS network performs handover to the CS network, the determining unit 1006 in the MSC/MGW 110 sets common part for a codec and a codec mode to be used by the two terminals, the common part being common among information indicating codecs and codec modes used for communication in the PS network, information indicating codecs and codec modes supported by the terminal (the UE 100) that performed the handover, and information indicating codecs and codec modes supported by the CS network. The signaling generating unit 1010 in the MSC/MGW 110 then generates signaling for requesting the two terminals to perform changing to the set codec and codec mode to be used by the two terminals.

As described above, in the present embodiment, even when the codecs and the codec modes used in the PS network cannot be supported in the CS network, the use of the codecs and codec modes in the common part allows the quality of a codec and a codec mode negotiated at the start of a session in the PS network to be ensured in the CS network, as in the first embodiment.

Also, according to the present embodiment, even when codecs and codec modes supported by the CS network, which is the handover target of UE, differ from a codec and a codec mode negotiated during session setup at the time of communication in the PS network, it is possible to continue the communication without departing from the policy of the service operator and what was negotiated during the session setup, as in the first embodiment.

Hence, in the present embodiment, even when the codec used by one of terminals that are performing communication is re-set, it is possible to continue the communication through suppression of call-quality deterioration.

Third Embodiment

A description in a third embodiment will be given of a method for reducing influences due to bit errors in the CS network when a codec utilizing a system (algorithm) that is not robust against bit errors, like the EVS primary mode, is selected as a codec that the UE 100 is to use in the CS network upon occurrence of SRVCC handover or eSRVCC handover of UE 100.

Figure 12:
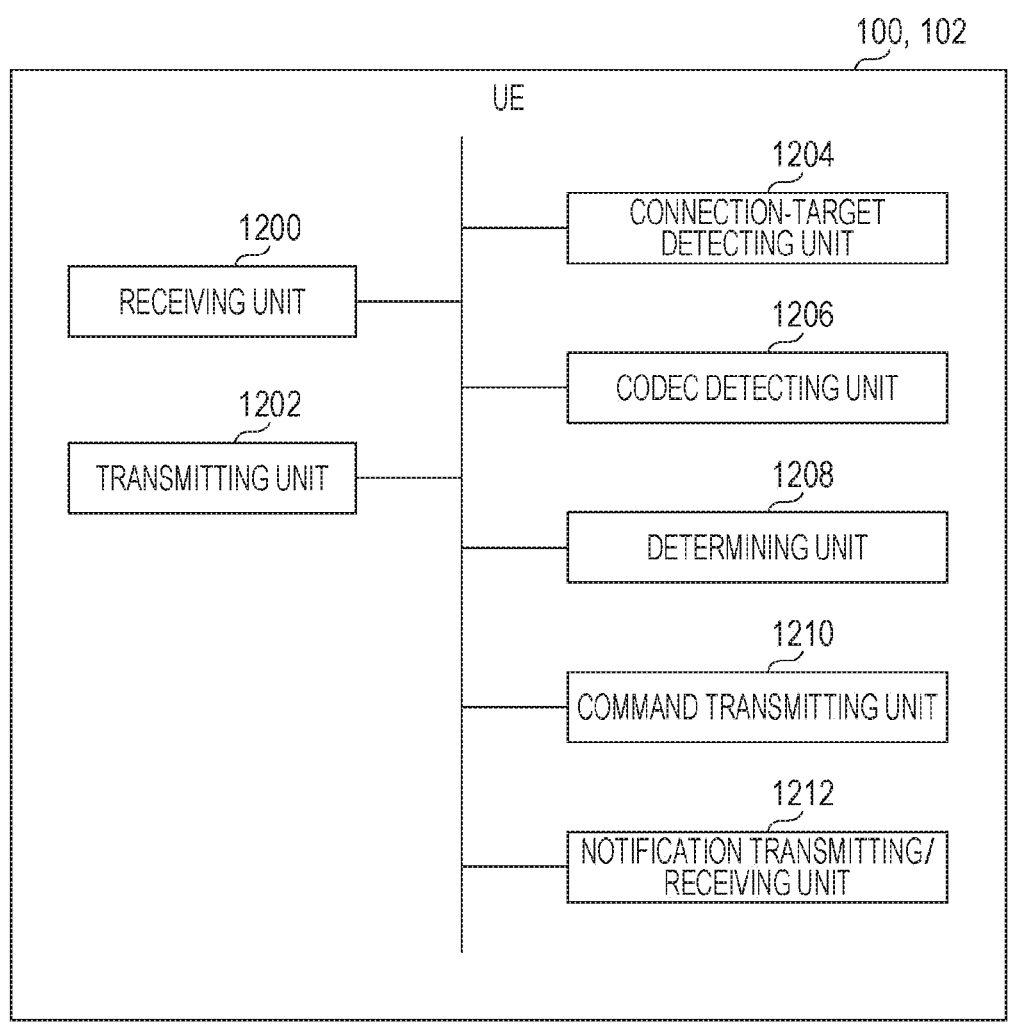
FIG. 12 is a block diagram illustrating the configuration of a terminal (UE) according to a third embodiment.

FIG. 12 is a block diagram illustrating the configuration of UEs 100 and 102 (terminals) according to the present embodiment. Each of the UEs 100 and 102 includes a receiving unit 1200, a transmitting unit 1202, a connection-target detecting unit 1204, a codec detecting unit 1206, a determining unit 1208, a command transmitting unit 1210, and a notification transmitting/receiving unit 1212. Each of the UEs 100 and 102 also has functions of a typical terminal, in addition to the constituent elements illustrated in FIG. 12.

The receiving unit 1200 receives communication data, signaling, and so on. The signaling received by the receiving unit 1200 is, for example, signaling for reporting that a communication partner terminal has performed handover to the CS network or that the encoding system for the codec needs to be limited, the signaling being transmitted from the communication partner terminal that has performed the handover to the CS network (or from a communication node on the data path).

The transmitting unit 1202 transmits communication data, signaling, and so on. The signaling transmitted by the transmitting unit 1202 is, for example, signaling for reporting, to a communication partner terminal in the PS network, that the local UE has performed handover to the CS network or the encoding system for the codec needs to be limited.

The connection-target detecting unit 1204 detects a connection-target network (the PS network or the CS network) to which the local UE is to connect owing to handover or the like.

The codec detecting unit 1206 detects a codec used in the connection-target network detected by the connection-target detecting unit 1204.

On the basis of the connection-target network detected by the connection-target detecting unit 1204 and the codec detected by the codec detecting unit 1206, the determining unit 1208 determines whether or not the encoding system for the codec to be used by the local UE and the communication partner terminal needs to be limited. For example, when the local UE performs handover from the PS network to the CS network, and the codec that is detected by the codec detecting unit 1206 and that is to be used in the CS network is a codec utilizing an encoding system that is not robust against bit errors, the determining unit 1208 determines that the encoding system needs to be limited.

For example, when the local UE performs handover to the CS network and the determining unit 1208 determines that the encoding system needs to be limited, or when the local UE is present in the PS network and the notification transmitting/receiving unit 1212 (described below) receives a notification indicating the connection-target network (or signaling for reporting that the encoding system is to be limited) from the communication partner terminal (that is present in the CS network), the command transmitting unit 1210 transmits, to the encoder (not illustrated), an internal command for limiting the encoding system to be used in the connection-target network.

The notification transmitting/receiving unit 1212 receives the notification indicating the connection-target network (i.e., the signaling for limiting the encoding system) from the communication partner terminal via the receiving unit 1200. For example, when the local UE performs handover to the CS network, and the determining unit 1208 determines that the encoding system needs to be limited, the notification transmitting/receiving unit 1212 generates signaling for reporting, to the communication partner terminal in the PS network, that the local UE has performed handover to the CS network or that the encoding system for the codec needs to be limited. This signaling is transmitted to the communication partner terminal via the transmitting unit 1202.

Next, a description will be given of the operation of the UE 100 according to the present embodiment.

For example, in FIGS. 6 and 11, when the UE 100 receives a command (HO Command) for handover from the eNB to the CS network (ST611) and changes the connection target to the RNC/nodeB (ST613), the connection-target detecting unit 1204 in the UE 100 detects that the connection-target network was changed to the CS network, by using base-station information or the like.

Also, in FIGS. 6 and 11, in the process in which the UE 100 connects to the RNC/nodeB (e.g., ST613), the codec detecting unit 1206 in the UE 100 detects a codec to be used in the CS network. The codec that the UE 100 is to use in the CS network has been reported, for example, from the MSC/MGW 110 to the RNC/nodeB (e.g., ST610). The method for setting the codec that the UE 100 is to use in the CS network may be the method described in the first or second embodiment or may be another method.

For example, the codec and the codec mode used for the UE 100 in the CS network are assumed to be 9.6 kbps and 13.2 kbps in the EVS primary mode. As described above, the CS network is a network in which bit errors can occur on a transmission path, and the EVS primary mode is a codec mode that is not adapted for bit errors. Hence, in this case, on the basis of information about the CS network detected by the connection-target detecting unit 1204 and information about the codec detected by the codec detecting unit 1206, the determining unit 1208 in the UE 100 detects that 9.6 kbps and 13.2 kbps in the EVS primary mode utilizing a system that is not robust against bit errors are to be used in the CS network in which bit errors can occur. That is, the determining unit 1208 determines that the encoding system for the codec to be used in the CS network needs to be limited.

The command transmitting unit 1210 in the UE 100 then transmits, to the encoder in the UE 100, an internal command for limiting the encoding system so as to perform encoding using only a system that is robust against bit errors.

Also, in FIGS. 6 and 11, initiation of IMS session transfer is performed between the MSC/MGW 110 and the IMS node 310 (ST612). The signaling generating unit 510 in the ATGW (the IMS node 310; see FIG. 5) or the signaling generating unit 1010 in the MSC/MGW 110 (see FIG. 10) generates signaling for reporting that the UE 100 has connected to the CS network or that the encoding system of the codec to be used is to be limited (i.e., encoding is to be performed utilizing a system that is robust against bit errors) and transmits the generated signaling to the UE 102.

That is, when the UE 100 determines that the encoding system needs to be limited, a communication node that exists on a data path of the UE 100 and the UE 102 generates signaling for reporting that the UE 100 has connected to the CS network or signaling for reporting that the encoding system of the codec is to be limited and transmits the signaling to the UE 102.

This signaling may be included in an RTP payload header or an RTCP. For example, in this signaling, a function for reporting that a communication partner (the UE 100 in FIGS. 6 and 11) has connected to the CS network or that the encoding system is to be limited may be added to a CMR (Codec Mode Request) byte field or bit in the RTP payload format header described in Non-Patent Document 9. Alternatively, a new field for reporting that a communication partner has connected to the CS network or that encoding system is to be limited may be added to a CMR in the RTCP-APP described in Non-Patent Document 10. Alternatively, this signaling may be issued using another method, such as IMS signaling.

Also, the timing at which the signaling for reporting that the UE 100 has connected to the CS network or that the encoding system is to be limited may be the same as or different from the transmission timing of the mode change request illustrated in FIGS. 6 and 11.

This signaling may implicitly or explicitly include information indicating that the EVS primary mode is used in the CS network. The signaling for reporting that the UE 100 has connected to the CS network or that the encoding system is to be limited may be transmitted from the UE 100 to the UE 102.

On the other hand, when the notification transmitting/receiving unit 1212 in the UE 102, which is a communication partner terminal of the UE 100 that has performed handover to the CS network, receives the signaling for reporting that the UE 100 has connected to the CS network or that the encoding system is to be limited, the notification transmitting/receiving unit 1212 detects that the UE 100 that has moved to the CS network performs communication using the EVS primary mode. The determining unit 1208 in the UE 102 then determines that the encoding system needs to be limited, and the command transmitting unit 1210 transmits, to the encoder (not illustrated) in the UE 102, an internal command for limiting the encoding system so as to perform encoding using only a system that is robust against bit errors.

The system for transmitting the internal command for performing encoding using only a system that is robust against bit errors when the EVS primary mode is used in the CS network, as described above, may be used not only when SRVCC handover or eSRVCC handover is performed but also, for example, when the UE 100 has connected to the CS network from the beginning. A method for reporting, to a communication partner terminal (e.g., the UE 102) that has connected to the PS network, that the UE 100 has connected to the CS network may be used not only when SRVCC handover or eSRVCC handover is performed but also, for example, at the start of communication performed when the UE 100 connects to the CS network and the UE 102 connects to the PS network.

Also, the "system that is robust against bit errors" may be an EVS AMR-WB compatible mode. In this case, when the connection-target detecting unit 1204 in the UE 100 detects a connection of the UE 100 to the CS network and detects the EVS as the codec that the codec detecting unit 1206 is to use in the CS network, the command transmitting unit 1210 transmits, to the encoder, an internal command for changing the encoding system to the AMR-WB compatible mode. Signaling for reporting to the UE 102 in this case may be a switching request for switching the EVS primary mode to the AMR-WB compatible mode, rather than reporting that the UE 100 has performed handover to the CS network.

This switching request may use a CMR byte in the RTP payload format header described in Non-Patent Document 9 or may use a CMR in the RTCP-APP described in Non-Patent Document 10. Alternatively, the switching request may be issued using another method, such as IMS signaling. The timing at which the switching request is transmitted may be the same as or different from the transmission timing of the mode change request illustrated in FIGS. 6 and 11. The switching request may also be transmitted from the UE 100 to the UE 102.

As described above, in the present embodiment, when the codec that the UE that has connected to the CS network uses in the CS network is set to a codec utilizing a system (algorithm) that is not robust against bit errors, like the EVS primary mode, each of the UEs 100 and 102 instructs the encoder so as to utilize a system (algorithm) that is not robust against bit errors.

According to the present embodiment, limiting the encoding system for the codec to be used in the CS network, as described above, makes it possible to suppress influences due to bit errors in the CS network, even when a codec utilizing a system that is not robust against bit errors is set for the UE that connects to the CS network. That is, even when the EVS codec is used in the CS network, decoding is correctly performed so as to correspond to bit errors that occur on a transmission path, thus making it possible to prevent quality deterioration.

Hence, according to the present embodiment, even when the present disclosure is used in a network in which bit errors can occur, communication can be continued through suppression of quality deterioration.

A case in which a policy for a payload format to be used differs from one service-providing operator to another occurs when the IMS performs session setup at the start of communication (e.g., ST601 in FIGS. 6 and 11). This policy means, for example, a policy indicating a system using both the compact format and the header full-format in the RTP payload format in the EVS codec described in Non-Patent Document 9 or a system using only the header full-format or a policy indicating a system using the Bandwidth-Efficient mode in the RTP payload format for the AMR or AMR-WB codec described in Non-Patent Document 8 or a system using the Octet-Aligned mode in the RTP payload format. When the policy regarding the payload format differs, the IMS node 310 may permit the difference in the policy, and for example, a node (e.g., the ATGW) that exists on a data path may change (transformat) the payload format.

The above description has been given of each embodiment according to the present disclosure.

In each embodiment above, each of the ATCF/ATGW 320, the MSC/MGW 110, and the SCCAS/CSCF has been described as being one node. However, each of the ATCF/ATGW 320, the MSC/MGW 110, and the SCCAS/CSCF may be configured by two or more independent nodes that are inter-connected via an interface. That is, the above-described functions may be distributed to a plurality of nodes between the ATCF and the ATGW, between the MSC and the MGW, and between the SCCAS and the CSCF.

In each embodiment above, the description has been given using codecs mainly for voice. However, the present disclosure is not limited thereto, and one aspect of the present disclosure is also applicable to music, sound, images, and so on.

In addition, the present disclosure is not limited to each embodiment described above and can be implemented in various modifications.

Also, although, in each embodiment, one aspect of the present disclosure has been described as being implemented by hardware by way of example, the present disclosure can also be realized by software in cooperation with hardware.

The above-described functional blocks described in each embodiment can typically be realized as a large-scale integration (LSI), which is an integrated circuit. The integrated circuit may control the individual functional blocks used in the description of the embodiments and may have an input and an output. The functional blocks may be individually integrated into single chips or at least one or all of the functional blocks may be integrated into a single chip. Although the functional blocks are implemented in the form of an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable to the integration.

According to one aspect of the present disclosure, even when codecs and codec modes supported by a CS network, which is a handover target of UE, differs from a codec and a codec mode negotiated in session setup at the start of communication, it is possible to continue the communication without departing from a policy of a service operator or what was negotiated in the session setup. The present disclosure is also useful for performing communication in which influences due to bit errors in a CS network are reduced, even when UE that has connected to the CS network uses a codec utilizing a system that is not robust against bit errors.

What is claimed is:

1. A communication node comprising:
   a determiner which, in operation, determines a codec and a codec mode to be used by a first terminal and a codec and a codec mode to be used by a second terminal, while the first terminal and the second terminal perform communication in a packet switched network, before the first terminal performs a handover from the packet switched network to a circuit switched network that is different from the packet switched network, the determiner determining the codec and codec mode to be used by the first terminal and the codec and codec mode to be used by the second terminal based on:
   information indicating codecs and codec modes used for communication in the packet switched network from which the handover is performed,
   information indicating codecs and codec modes supported by the first terminal, and
   information indicating codecs and codec modes supported by the circuit switched network to which the handover is performed,
   wherein, when (i) a common codec is included in each of the information indicating codecs and codec modes used for communication in the packet switched network from which the handover is performed, the information indicating codecs and codec modes supported by the first terminal, and the information indicating codecs and codec modes supported by the circuit switched network to which the handover is performed, (ii) a range of bit rates indicated by a first bit rate value and a second bit rate value are included in the information indicating codecs and codec modes supported by the first terminal, and (iii) a plurality of bit rate values for the common codec is included in the information indicating codecs and codec modes supported by the circuit switched network to which the handover is performed:
   the determiner determines a common upper-limit value based on the first bit rate value and the second bit rate value included in the information indicating codecs and codec modes supported by the first terminal and the plurality of bit rate values included in the information indicating codecs and codec modes supported by the circuit switched network to which the handover is performed, the common upper-limit value being different from the first bit rate value and the second bit rate value included in the information indicating codecs and codec modes supported by the first terminal, the determiner determines that the codec to be used by the first terminal and the codec to be used by the second terminal is the common codec, and the determiner determines that the codec mode to be used by the first terminal and the codec mode to be used by the second terminal is the common upper-limit value; and a generator which, in operation, generates first signaling before the first terminal performs the handover from the packet switched network to the circuit switched network, wherein the first signaling indicates the codec and codec mode to be used by the first terminal determined by the determiner, and generates second signaling after the first terminal performs the handover from the packet switched network to the circuit switched network, wherein the second signaling requests the second terminal to communicate using the codec and codec mode to be used by the second terminal determined by the determiner.

2. The communication node according to claim 1,
wherein, when (i) the there is no common part among the information indicating codecs and codec modes used for communication in the packet switched network from which the handover is performed, the information indicating codecs and codec modes supported by the first terminal, and the information indicating codecs and codec modes supported by the circuit switched network to which the handover is performed, (ii) a first codec used for communication in the packet switched network has a compatible mode with a second codec, and (iii) the codecs supported by the first terminal and the codecs supported by the circuit switched network include the second codec, the determiner determines that the codec to be used by the first terminal is the second codec, and the codec and codec mode to be used by the second terminal are the first codec and the compatible mode with the second codec, respectively.

3. The communication node according to claim 2, wherein the codec mode to be used by the first terminal determined by the determining is different from a codec mode used by the first terminal before the handover.

4. The communication node according to claim 2, wherein the codec mode to be used by the second terminal determined by the determining is different from a codec mode used by the second terminal before the handover.

5. The communication node according to claim 1, wherein, when a policy of a service operator is referred to by the communication node, the determiner determines that the codec and codec mode to be used by the first terminal and the codec and codec mode to be used by the second terminal, in accordance with the policy, and when the policy is not referred to by the communication node, the determiner determines that the codec and codec mode to be used by the first terminal and the codec and codec mode to be used by the second terminal based on a common part among the information indicating codecs and codec modes used for communication in the packet switched network, the information indicating codecs and codec modes supported by the one first terminal, and the information indicating codecs and codec modes supported by the circuit switched network.

6. The communication node according to claim 1, wherein the common upper-limit value is different from a bit rate used by the first terminal before the handover.

7. The communication node according to claim 1, wherein the common upper-limit value is different from a bit rate used by the second terminal before the handover.

8. The communication node according to claim 1, wherein the common upper-limit value is a maximum bit rate value of the plurality of plurality of bit rate values for the common codec is included in the information indicating codecs and codec modes supported by the circuit switched network to which the handover is performed that is within the range of bit rates indicated by the first bit rate value and the second bit rate value are included in the information indicating codecs and codec modes supported by the first terminal.

9. A communication control method comprising:
determining a codec and a codec mode to be used by both a first terminal and a codec and a codec mode to be used by a second terminal, while the first terminal and the second perform communication in a packet switched network, before the first terminal performs a handover from the packet switched network to a circuit switched network that is different from the packet switched network, the determining being based on:
information indicating codecs and codec modes used for communication in the packet switched network from which the handover is performed,
information indicating codecs and codec modes supported by the first terminal, and
information indicating codecs and codec modes supported by the circuit switched network to which the handover is performed,
wherein, when (i) a common codec is included in each of the information indicating codecs and codec modes used for communication in the packet switched network from which the handover is performed, the information indicating codecs and codec modes supported by the first terminal, and the information indicating codecs and codec modes supported by the circuit switched network to which the handover is performed, (ii) a range of bit rates indicated by a first bit rate value and a second bit rate value are included in the information indicating codecs and codec modes supported by the first terminal, and (iii) a plurality of bit rate values for the common codec is included in the information indicating codecs and codec modes supported by the circuit switched network to which the handover is performed:
the determining includes:
determining a common upper-limit value based on the first bit rate value and the second bit rate value included in the information indicating codecs and codec modes supported by the first terminal and the plurality of bit rate values included in the information indicating codecs and codec modes supported by the circuit switched network to which the handover is performed, the common upper-limit value being different from the first bit rate value and the second bit rate value included in the information indicating codecs and codec modes supported by the first terminal,
determining that the codec to be used by the first terminal and the codec to be used by the second terminal is the common codec, and
determining that the codec mode to be used by the first terminal and the codec mode to be used by the second terminal is the common upper-limit value;
generating first signaling before the first terminal performs the handover from the packet switched network to the circuit switched network, wherein the first signaling indicates the codec and codec mode to be used by the first terminal determined by the determining; and generating second signaling after the first terminal performs the handover from the packet switched network to the circuit switched network, wherein the second signaling requests the second terminal to communicate using the codec and codec mode to be used by the second terminal determined by the determining.

10. The communication control method according to claim 9, wherein, when (i) there is no common part among the information indicating codecs and codec modes used for communication in the packet switched network from which the handover is performed, the information indicating codecs and codec modes supported by the first terminal, and the information indicating codecs and codec modes supported by the circuit switched network to which the handover is performed, (ii) a first codec used for communication in the packet switched network has a compatible mode with a second codec, and (iii) the codecs supported by the first terminal and the codecs supported by the circuit switched network include the second codec:

the determining includes determining that the codec to be used by the first terminal is the second codec, and the codec and codec mode to be used by the second terminal are the first codec and the compatible mode with the second codec, respectively.

11. The communication control method according to claim 10, wherein the codec mode to be used by the first terminal determined by the determining is different from a codec mode used by the first terminal before the handover.

12. The communication control method according to claim 10, wherein the codec mode to be used by the second terminal determined by the determining is different from a codec mode used by the second terminal before the handover.

13. The communication control method according to claim 9, wherein, when a policy of a service operator is referred to by the communication node, the determining includes determining that the codec and codec mode to be used by the first terminal and the codec and codec mode to be used by the second terminal, in accordance with the policy, and when the policy is not referred to by the communication node:

the determining includes determining that the codec and codec mode to be used by the first terminal and the codec and codec mode to be used by the second terminal based on a common part among the information indicating codecs and codec modes used for communication in the packet switched network, the information indicating codecs and codec modes supported by the one first terminal, and the information indicating codecs and codec modes supported by the circuit switched network.

14. The communication control method according to claim 9, wherein the common upper-limit value is different from a bit rate used by the first terminal before the handover.

15. The communication control method according to claim 9, wherein the common upper-limit value is different from a bit rate used by the first terminal before the handover.

16. The communication control method according to claim 9, wherein the common upper-limit value is a maximum bit rate value of the plurality of plurality of bit rate values for the common codec is included in the information indicating codecs and codec modes supported by the circuit switched network to which the handover is performed that is within the range of bit rates indicated by the first bit rate value and the second bit rate value are included in the information indicating codecs and codec modes supported by the first terminal.

* * * * *